(12) United States Patent
Cui et al.

(10) Patent No.: US 12,344,279 B2
(45) Date of Patent: *Jul. 1, 2025

(54) SYSTEMS AND METHODS FOR MOTION FORECASTING AND PLANNING FOR AUTONOMOUS VEHICLES

(71) Applicant: Aurora Operations, Inc., Pittsburgh, PA (US)

(72) Inventors: Alexander Yuhao Cui, Toronto (CA); Abbas Sadat, Toronto (CA); Sergio Casas, Toronto (CA); Renjie Liao, Pittsburgh, PA (US); Raquel Urtasun, Toronto (CA)

(73) Assignee: AURORA OPERATIONS, INC., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/658,674

(22) Filed: May 8, 2024

(65) Prior Publication Data
US 2024/0367688 A1     Nov. 7, 2024

Related U.S. Application Data

(63) Continuation of application No. 17/528,539, filed on Nov. 17, 2021, now Pat. No. 12,037,025.
(Continued)

(51) Int. Cl.
*B60W 60/00* (2020.01)
*B60W 40/00* (2006.01)
(Continued)

(52) U.S. Cl.
CPC ........ *B60W 60/0027* (2020.02); *B60W 40/04* (2013.01); *G05B 13/027* (2013.01); *G06N 3/045* (2023.01)

(58) Field of Classification Search
CPC .. B60W 60/0027; B60W 40/04; G06N 3/045; G05B 13/027
(Continued)

(56) References Cited

U.S. PATENT DOCUMENTS

| 11,260,855 B2 | 3/2022 | Zhang |
| 2019/0113927 A1 | 4/2019 | Englard et al. |

(Continued)

OTHER PUBLICATIONS

Ajanovic et al., "Search-Based Optimal Motion Planning for Automated Driving", arXiv:1803.04868v2, Aug. 3, 2018, 8 pages.
(Continued)

*Primary Examiner* — Tiffany P Young
(74) *Attorney, Agent, or Firm* — Dority & Manning, P.A.

(57) ABSTRACT

Systems and methods are disclosed for motion forecasting and planning for autonomous vehicles. For example, a plurality of future traffic scenarios are determined by modeling a joint distribution of actor trajectories for a plurality of actors, as opposed to an approach that models actors individually. As another example, a diversity objective is evaluated that rewards sampling of the future traffic scenarios that require distinct reactions from the autonomous vehicle. An estimated probability for the plurality of future traffic scenarios can be determined and used to generate a contingency plan for motion of the autonomous vehicle. The contingency plan can include at least one initial short-term trajectory intended for immediate action of the AV and a plurality of subsequent long-term trajectories associated with the plurality of future traffic scenarios.

20 Claims, 8 Drawing Sheets

Related U.S. Application Data

(60) Provisional application No. 63/114,790, filed on Nov. 17, 2020.

(51) Int. Cl.
    *B60W 40/04* (2006.01)
    *G05B 13/02* (2006.01)
    *G06N 3/045* (2023.01)

(58) Field of Classification Search
    USPC .......................................................... 701/26
    See application file for complete search history.

(56) References Cited

U.S. PATENT DOCUMENTS

| | | | |
|---|---|---|---|
| 2021/0081843 | A1 | 3/2021 | Banijamali et al. |
| 2021/0150350 | A1 | 5/2021 | Gao et al. |
| 2021/0286371 | A1* | 9/2021 | Choi .................... G05D 1/0219 |
| 2021/0302975 | A1* | 9/2021 | McGill, Jr. .......... G05D 1/0221 |
| 2021/0312177 | A1 | 10/2021 | Bansal et al. |
| 2021/0334630 | A1* | 10/2021 | Lambert ................ G06N 3/047 |

OTHER PUBLICATIONS

Casas et al., "Spatially-Aware Graph Neural Networks for Relational Behavior Forecasting from Sensor Data", arXiv:1910.08233v1, Oct. 18, 2019, 11 pages.
Casas et al., "Implicit Latent Variable Model for Scene-Consistent Motion Forecasting", arXiv:2007.12036v1, Jul. 23, 2020, 44 pages.
Casas et al., "IntentNet: Learning to Predict Intention from Raw Sensor Data", arXiv:2101.07907v1, Jan. 20, 2021, 10 pages.
Chai et al., "MultiPath: Multiple Probabilistic Anchor Trajectory Hypotheses for Behavior Prediction", arXiv:1910.05449v1, Oct. 12, 2019, 14 pages.
Cui et al., "Multimodal Trajectory Predictions for Autonomous Driving using Deep Convolutional Networks", arXiv:1809.10732v2, Mar. 1, 2019, 7 pages.
Djuric et al., "Uncertainty-aware Short-term Motion Prediction of Traffic Actors for Autonomous Driving", arXiv:1808.05819v3, Mar. 4, 2020, 10 pages.
Fan et al., "An Auto-tuning Framework for Autonomous Vehicles", arXiv:1808.04913v1, Aug. 14, 2018, 7 pages.
Gu et al., "On-Road Motion Planning for Autonomous Vehicles", https://www.ri.cmu.edu/pub_files/2012/10/ICIRA2012.pdf, Conference Paper, Proceedings of 5th International Conference on Intelligent Robotics and Applications (ICIRA '12), pp. 588-597, Oct. 2012, 13 pages.
Hardy et al., "Contingency Planning over Probabilistic Hybrid Obstacle Predictions for Autonomous Road Vehicles", http://vigir.missouri.edu/~gdesouza/Research/Conference_CDs/IEEE_IROS_2010/data/papers/1320.pdf, 6 pages.
Higgins et al., "beta-VAE: Learning Basic Visual Concepts with a Constrained Variational Framework", /https://openreview.net/pdf?id=Sy2fzU9gl, 22 pages.
Hong et al., "Rules of the Road: Predicting Driving Behavior with a Convolutional Model of Semantic Interactions", arXiv:1906.08945v1, Jun. 21, 2019, 9 pages.
Huang et al., "DiversityGAN: Diversity-Aware Vehicle Motion Prediction via Latent Semantic Sampling", arxIV:1911.12736V2, Mar. 22, 2020, 8 pages.

Ma et al., "Arbitrary-Oriented Scene Text Detection via Rotation Proposals", arXiv:1703.01086v3, Mar. 15, 2018, 11 pages.
Manivasagam et al., "LiDARsim: Realistic LiDAR Simulation by Leveraging the Real World", arXiv:2006.09348v1, Jun. 16, 2020, 11 pages.
Paden et al., "A Survey of Motion Planning and Control Techniques for Self-driving Urban Vehicles", arXiv:1604.07446v1, Apr. 25, 2016, 27 pages.
Park et al., "Diverse and Admissible Trajectory Forecasting through Multimodal Context Understanding", arXiv:2003.03212v4, Aug. 31, 2020, 27 pages.
Phan et al., "CoverNet: Multimodal Behavior Prediction using Trajectory Sets", arXiv:1911.10298v2, Apr. 1, 2020, 12 pages.
Rhinehart et al., "PRECOG:PREdiction Conditioned on Goals in Visual Multi-Agent Settings", arXiv:1905.01296v3, Sep. 30, 2019, 24 pages.
Rhinehart et al., "R2P2: A ReparameteRized Pushforward Policy for Diverse, Precise Generative Path Forecasting", /https://www.ecva.net/papers/eccv_2018/papers_ECCV/papers/Nicholas_Rhinehart_R2P2_A_ReparameteRized_ECCV_2018_paper.pdf, 17 pages.
Sadat et al., "Jointly Learnable Behavior and Trajectory Planning for Self-Driving Vehicles", arXiv:1910.04586v1, Oct. 10, 2019, 8 pages.
Sadat et al., "Perceive, Predict, and Plan: Safe Motion Planning Through Interpretable Semantic Representations", arXiv:2008.05930v1, Aug. 13, 2020, 28 pages.
Sohn et al., "Learning structured output representation using deep conditional generative models.", http://www.cs.toronto.edu/~bonner/courses/2020s/csc2547/papers/generative/conditional-image-generation/conditional-vae,-sohn,-nips2015.pdf, 9 pages.
Tang et al., "Multiple Futures Prediction", arXiv:1911.00997v2, Dec. 6, 2019, 17 pages.
Tas et al., "Decision-Time Postponing Motion Planning for Combinatorial Uncertain Maneuvering", arXiv:2012.07170v1, Dec. 13, 2020, 7 pages.
Treiber et al., "Congested Traffic States in Empirical Observations and Microscopic Simulations", http://arxiv.org/abs/cond-mat/0002177v2, Aug. 30, 2000, 47 pages.
Werling et al., "Optimal Trajectory Generation for Dynamic Street Scenarios in a Frenet Frame", https://www.researchgate.net/profile/Moritz-Werling/publication/224156269_Optimal_Trajectory_Generation_for_Dynamic_Street_Scenarios_in_a_Frenet_Frame/links/54f749df0cf210398e9277af/Optimal-Trajectory-Generation-for-Dynamic-Street-Scenarios-in-a-Frenet-Frame.pdf, 8 pages.
Yang et al., "PIXOR: Real-time 3D Object Detection from Point Clouds", arXiv:1902.06326v3, Mar. 2, 2019, 10 pages.
Yoon et al., "Probabilistic Planning via Determinization in Hindsight", https://rakaposhi.eas.asu.edu/ffhop.pdf, 7 pages.
Yuan et al., "Diverse Trajectory Forecasting with Determinantal Point Processes", arXiv:1907.04967v2.
Yuan et al., "DLow: Diversifying Latent Flows for Diverse Human Motion Prediction", arXiv:2003.08386v2, Jul. 22, 2020, 25 pages.
Zeng et al., "DSDNet: Deep Structured self-Driving Network", arXiv:2008.06041v1, Aug. 13, 2020, 24 pages.
Zhan et al., "A Non-Conservatively Defensive Strategy for Urban Autonomous Driving", http://www.cs.cmu.edu/~cliu6/files/itsc16.pdf, 6 pages.
Zhao et al., "TNT: Target-driveN Trajectory Prediction", arXiv:2008.08294v2, Aug. 21, 2020, 12 pages.
Ziegler et al., "Trajectory planning for Bertha—A local, continuous method", 2014 IEEE Intelligent Vehicles Symposium Proceedings, 2014, pp. 450-457, doi: 10.1109/IVS.2014.6856581., 8 pages.

\* cited by examiner

SYSTEMS AND METHODS FOR MOTION FORECASTING AND PLANNING FOR AUTONOMOUS VEHICLES

RELATED APPLICATION

The present application is based on and claims the benefit of U.S. patent application Ser. No. 17/528,539 having a filing date of Nov. 17, 2021 and Provisional Patent Application No. 63/114,790 having a filing date of Nov. 17, 2020, which are incorporated by reference herein in their entirety.

BACKGROUND

An autonomous platform can process data to perceive an environment through which the platform can travel. For example, an autonomous vehicle can perceive its environment using a variety of sensors and identify objects around the autonomous vehicle. The autonomous vehicle can identify an appropriate path through the perceived surrounding environment and navigate along the path with minimal or no human input.

SUMMARY

Aspects and advantages of embodiments of the present disclosure will be set forth in part in the following description, or may be learned from the description, or may be learned through practice of the embodiments. Aspects of the present disclosure are directed to systems and methods of motion forecasting and planning for autonomous vehicles, including but not limited to self-driving vehicles (SDVs). In particular, there is a need for SDVs to anticipate a diverse set of future traffic scenarios. As such, a motion forecasting and planning model determines a compact set of diverse future scenarios that covers a wide range of possibilities, particularly those that might interact with the SDV. The model can also include a contingency planner that improves planning over the samples by planning a trajectory for each possible future without being overly cautious.

According to one example aspect, systems and methods of the present disclosure can determine a plurality of actors within an environment of an autonomous vehicle, wherein the plurality of actors are determined from sensor data (e.g., LIDAR data) descriptive of the environment. A sample of a plurality of future traffic scenarios can be determined based on the sensor data. In some instances, the plurality of future traffic scenarios are determined by modeling a joint distribution of actor trajectories for the plurality of actors, as opposed to an approach that models actors individually. In some instances, a diversity objective is evaluated that rewards sampling of the future traffic scenarios that require distinct reactions from the autonomous vehicle. An estimated probability for the plurality of future motion scenarios can be determined and used to generate a contingency plan for motion of the autonomous vehicle. The contingency plan can include at least one initial short-term trajectory intended for immediate action of the AV and a plurality of subsequent long-term trajectories associated with the plurality of future motion scenarios.

Aspects of the present disclosure can provide a number of technical improvements to autonomous forecasting and motion planning. By modeling the joint distribution of agent trajectories, the proposed systems improve motion forecast and reduce computer resource usage. In particular, previous forecasting systems would predict the marginal distribution of each actor's future trajectory in a traffic scene. However, marginal distributions may not reflect future interactions among multiple agents in a scene. Thus, such predictions were not scene consistent. If a Monte-Carlo sampling of the latent variables that encode unobserved scene dynamics and decode those into agents' future trajectories were used to reflect the state of prediction more accurately, a prohibitively large number of samples would be required to cover a diverse range of possible future scenarios, particularly given that the samples will concentrate at the main modes of the predicted joint distribution. The proposed systems and methods allow for more accurate prediction while using less computer resources due to the decreased volume of samples, allowing the system to run at a much lower latency.

In an aspect, the present disclosure provides a computer-implemented method for motion forecasting and planning. The method may include determining (e.g., by a computing system including one or more processors, etc.) a plurality of actors within an environment of an autonomous vehicle from sensor data descriptive of the environment. The method may include determining (e.g., by the computing system, etc.) a plurality of future motion scenarios based on the sensor data by modeling a joint distribution of predicted actor trajectories for the plurality of actors. The method may include determining (e.g., by the computing system, etc.) an estimated probability for the plurality of future motion scenarios. The method may include generating (e.g., by the computing system, etc.) a contingency plan for motion of the autonomous vehicle, wherein the contingency plan includes at least one initial short-term trajectory and a plurality of subsequent long-term trajectories associated with the plurality of future motion scenarios, and wherein the contingency plan is generated based on the plurality of future motion scenarios and the estimated probability for the plurality of future motion scenarios.

In some implementations, determining a plurality of future motion scenarios based on the sensor data by modeling a joint distribution of predicted actor trajectories for the plurality of actors includes evaluating a diversity objective that rewards sampling of the plurality of future motion scenarios that require distinct reactions from the autonomous vehicle.

In some implementations, determining a plurality of actors within an environment of an autonomous vehicle from sensor data descriptive of the environment includes processing features from the sensor data and corresponding map data with a first machine-learned model to generate one or more object detections corresponding to the plurality of actors.

In some implementations, determining a plurality of actors within an environment of an autonomous vehicle from sensor data descriptive of the environment includes processing the one or more object detections with a second machine-learned model to generate a respective feature vector defining a local context for one or more of the plurality of actors.

In some implementations, the first machine-learned model, the second machine-learned model, an encoder, and a prediction decoder are jointly trained for object detection and motion forecasting.

In some implementations, determining a plurality of future motion scenarios based on the sensor data by modeling a joint distribution of predicted actor trajectories for the plurality of actors includes mapping a shared noise across a joint set of latent variables that represent the joint distribution of the predicted actor trajectories for the plurality of actors to determine the plurality of future motion scenarios.

In some implementations, determining a plurality of future motion scenarios based on the sensor data by modeling a joint distribution of predicted actor trajectories for the plurality of actors includes employing a graph neural network (GNN) for the mapping of the shared noise across the joint set of latent variables.

In some implementations, determining a plurality of future motion scenarios based on the sensor data by modeling a joint distribution of predicted actor trajectories for the plurality of actors includes evaluating an energy function comprising one or more energy terms configured to promote diversity among the plurality future motion scenarios.

In some implementations, determining an estimated probability for the plurality of future motion scenarios includes employing the GNN to output a score corresponding to the estimated probability for the plurality of future motion scenarios.

In some implementations, generating a contingency plan for motion of the autonomous vehicle, wherein the contingency plan includes at least one initial short-term trajectory and a plurality of subsequent long-term trajectories associated with the plurality of future motion scenarios, and wherein the contingency plan is generated based on the plurality of future motion scenarios and the estimated probability for the plurality of future motion scenarios includes optimizing a planner cost function including a linear combination of subcosts that encode different aspects of driving, the different aspects of driving including two or more of comfort, motion rules, or route.

In some implementations, generating a contingency plan for motion of the autonomous vehicle, wherein the contingency plan includes at least one initial short-term trajectory and a plurality of subsequent long-term trajectories associated with the plurality of future motion scenarios, and wherein the contingency plan is generated based on the plurality of future motion scenarios and the estimated probability for the plurality of future motion scenarios includes generating a plurality of paths, determining a set of initial short-term trajectories by sampling a first set of velocity profiles for the plurality of paths, and determining a set of subsequent long-term trajectories by sampling a second set of velocity profiles that are conditioned on an end state of the set of initial short-term trajectories.

In another aspect, the present disclosure provides an autonomous vehicle control system including one or more processors, and one or more computer-readable medium storing instructions that when executed by the one or more processors cause the autonomous vehicle to perform operations. The operations may include determining a plurality of actors within an environment of an autonomous vehicle, wherein the plurality of actors are determined from sensor data descriptive of the environment. The operations may include determining a plurality of future traffic scenarios based on the sensor data, wherein the plurality of future traffic scenarios are determined by modeling a joint distribution of actor trajectories for the plurality of actors. The operations may include determining an estimated probability for the plurality of future traffic scenarios. The operations may include generating a contingency plan for motion of the autonomous vehicle, wherein the contingency plan includes at least one initial short-term trajectory and a plurality of subsequent long-term trajectories associated with the plurality of future traffic scenarios, and wherein the contingency plan is generated based on the plurality of future traffic scenarios and the estimated probability for the plurality of future motion scenarios.

In some implementations, determining a plurality of future traffic scenarios based on the sensor data, wherein the plurality of future traffic scenarios are determined by modeling a joint distribution of actor trajectories for the plurality of actors includes evaluating a diversity objective that rewards sampling of the future traffic scenarios that require distinct reactions from the autonomous vehicle.

In some implementations, determining a plurality of actors within an environment of an autonomous vehicle, wherein the plurality of actors are determined from sensor data descriptive of the environment includes employing a first machine-learned model configured to generate multi-class object detections and a second machine-learned model configured to generate respective feature vectors defining a local context for one or more of the plurality of actors.

In some implementations, determining a plurality of future traffic scenarios based on the sensor data, wherein the plurality of future traffic scenarios are determined by modeling a joint distribution of actor trajectories for the plurality of actors includes mapping a shared noise across a joint set of latent variables that represent the joint distribution of the predicted actor trajectories for the plurality of actors to determine the plurality of future motion scenarios.

In some implementations, determining a plurality of future traffic scenarios based on the sensor data, wherein the plurality of future traffic scenarios are determined by modeling a joint distribution of actor trajectories for the plurality of actors includes employing a graph neural network (GNN) for the mapping of the shared noise across the joint set of latent variables.

In some implementations, determining an estimated probability for the plurality of future traffic scenarios includes employing the GNN employed for determining a plurality of future traffic scenarios based on the sensor data, wherein the plurality of future traffic scenarios are determined by modeling a joint distribution of actor trajectories for the plurality of actors to output a score corresponding to the estimated probability for the plurality of future traffic scenarios.

In some implementations, generating a contingency plan for motion of the autonomous vehicle, wherein the contingency plan includes at least one initial short-term trajectory and a plurality of subsequent long-term trajectories associated with the plurality of future traffic scenarios, and wherein the contingency plan is generated based on the plurality of future traffic scenarios and the estimated probability for the plurality of future motion scenarios includes optimizing a planner cost function including a linear combination of subcosts that encode different aspects of driving, the different aspects of driving including two or more of comfort, motion rules, or route.

In some implementations, generating a contingency plan for motion of the autonomous vehicle, wherein the contingency plan includes at least one initial short-term trajectory and a plurality of subsequent long-term trajectories associated with the plurality of future traffic scenarios, and wherein the contingency plan is generated based on the plurality of future traffic scenarios and the estimated probability for the plurality of future motion scenarios includes generating a plurality of paths, determining a set of initial short-term trajectories by sampling a first set of velocity profiles for the plurality of paths, and determining a set of subsequent long-term trajectories by sampling a second set of velocity profiles that are conditioned on an end state of the set of initial short-term trajectories.

In another aspect, the present disclosure provides an autonomous vehicle including one or more processors and one or more computer-readable medium storing instructions that when executed by the one or more processors cause the autonomous vehicle control system to perform operations. The operations may include determining a plurality of actors within an environment of the autonomous vehicle, wherein the plurality of actors are determined from sensor data descriptive of the environment. The operations may include determining a plurality of future traffic scenarios based on the sensor data, wherein the plurality of future traffic scenarios are determined by modeling a joint distribution of actor trajectories for the plurality of actors. The operations may include determining an estimated probability of the plurality of future traffic scenarios. The operations may include generating a contingency plan for motion of the autonomous vehicle, wherein the contingency plan includes at least one initial short-term trajectory and a plurality of subsequent long-term trajectories associated with the plurality of future traffic scenarios, and wherein the contingency plan is generated based on the plurality of future traffic scenarios and the estimated probability for the plurality of future motion scenarios. The operations may include controlling motion of the autonomous vehicle based on the contingency plan.

Other example aspects of the present disclosure are directed to other systems, methods, vehicles, apparatuses, tangible non-transitory computer-readable media, and devices for generating data (e.g., scene representations, simulation data, training data, etc.), training models, and performing other functions described herein. These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

The following describes the technology of this disclosure within the context of an autonomous vehicle for example purposes only. As described herein, the technology is not limited to an autonomous vehicle and can be implemented within other robotic and computing systems. For example, the systems and methods disclosed herein can be implemented in a variety of ways including, but not limited to, a computer-implemented method, an autonomous vehicle system, an autonomous vehicle control system, an autonomous vehicle system, or a general robotic device control system.

Figure 1:
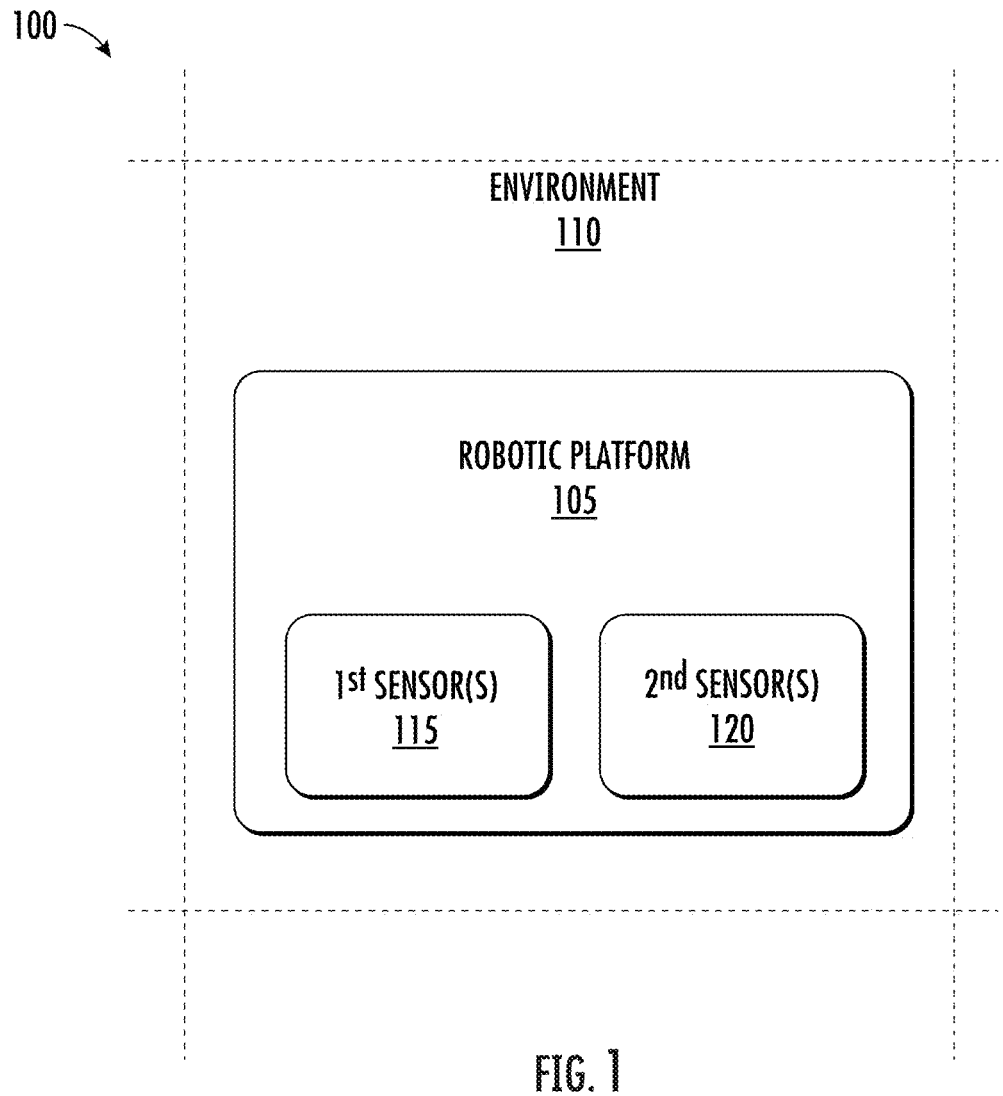
FIG. 1 is a block diagram of a computing platform, according to some implementations of the present disclosure.

With reference now to FIGS. 1-9, example implementations of the present disclosure will be discussed in further detail. FIG. 1 depicts a block diagram of an example operational scenario 100 according to example implementations of the present disclosure. The operational scenario 100 includes an autonomous vehicle 105 and an environment 110. The environment 110 can be external to the autonomous vehicle 105. The autonomous vehicle 105, for example, can operate within the environment 110. The environment 110 can include an indoor environment (e.g., within one or more facilities, etc.) or an outdoor environment. An outdoor environment, for example, can include one or more areas in the outside world such as, for example, one or more rural areas (e.g., with one or more rural travel ways, etc.), one or more urban areas (e.g., with one or more city travel ways, etc.), one or more suburban areas (e.g., with one or more suburban travel ways, etc.), etc. An indoor environment, for example, can include environments enclosed by a structure such as a building (e.g., a service depot, manufacturing facility, etc.).

The autonomous vehicle 105 can include one or more sensor(s) 115, 120. The one or more sensors 115, 120 can be configured to generate or store data descriptive of the environment 110 (e.g., one or more static or dynamic objects therein, etc.). The sensor(s) 115, 120 can include one or more LIDAR systems, one or more Radio Detection and Ranging (RADAR) systems, one or more cameras (e.g., visible spectrum cameras or infrared cameras, etc.), one or more sonar systems, one or more motion sensors, or other types of image capture devices or sensors. The sensor(s) 115, 120 can include multiple sensors of different types. For instance, the sensor(s) 115, 120 can include one or more first sensor(s) 115 and one or more second sensor(s) 120. The first sensor(s) 115 can include a different type of sensor than the second sensor(s) 120. By way of example, the first sensor(s) 115 can include one or more imaging device(s) (e.g., cameras, etc.), whereas the second sensor(s) 120 can include one or more depth measuring device(s) (e.g., LIDAR device, etc.).

The autonomous vehicle 105 can include any type of platform configured to operate within the environment 110. For example, the autonomous vehicle 105 can include one or more different type(s) of vehicle(s) configured to perceive and operate within the environment 110. The vehicles, for example, can include one or more autonomous vehicle(s) such as, for example, one or more autonomous trucks. By way of example, the autonomous vehicle 105 can include an autonomous truck including an autonomous tractor coupled to a cargo trailer. In addition, or alternatively, the autonomous vehicle 105 can include any other type of vehicle such as one or more aerial vehicles, ground-based vehicles, water-based vehicles, space-based vehicles, etc.

Figure 2:
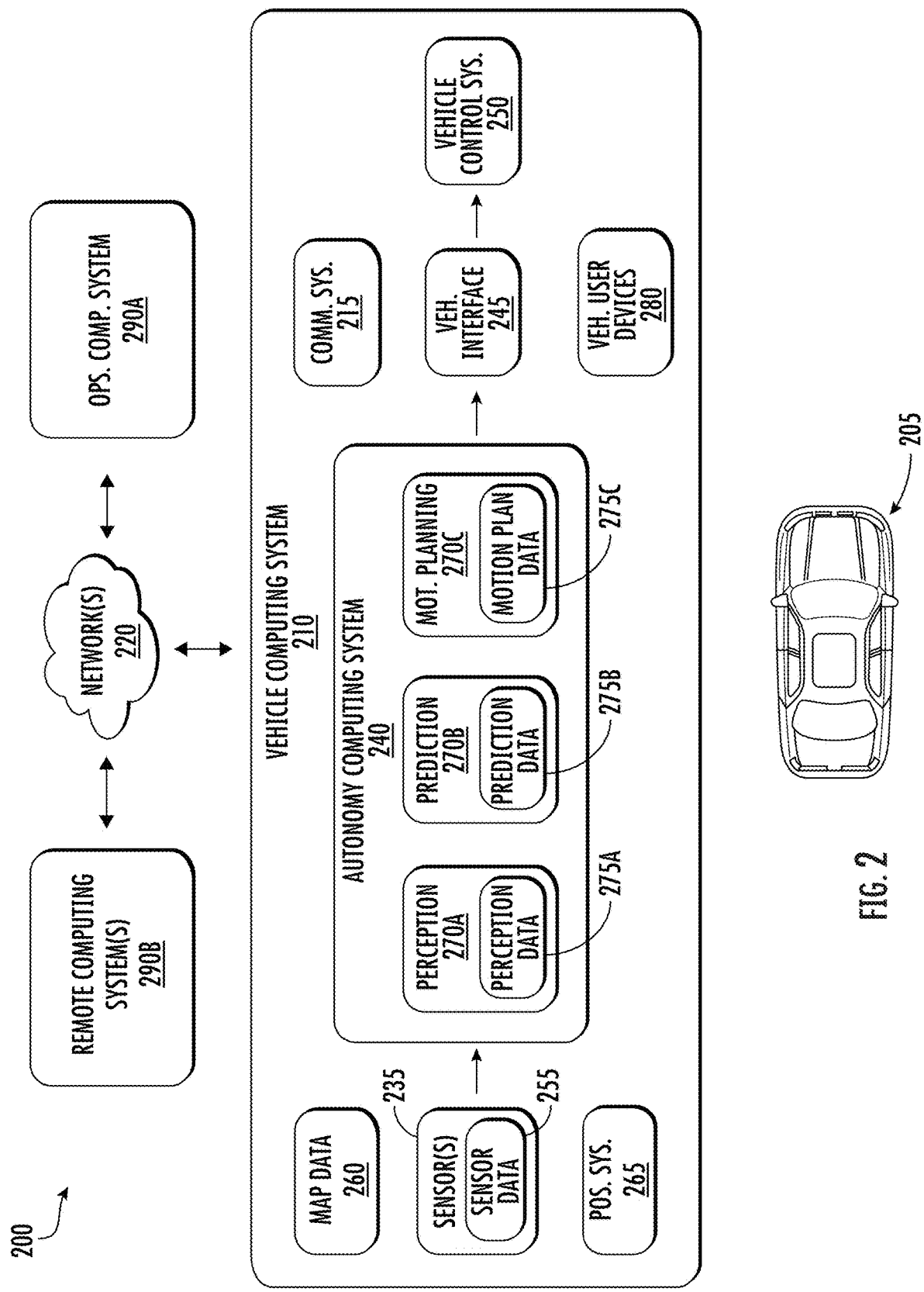
FIG. 2 is a block diagram of a system, according to some implementations of the present disclosure.

FIG. 2 depicts an example system overview of the autonomous vehicle as an autonomous vehicle according to example implementations of the present disclosure. More particularly, FIG. 2 illustrates a vehicle 205 including various systems and devices configured to control the operation of the vehicle 205. For example, the vehicle 205 can include an onboard vehicle computing system 210 (e.g., located on or within the autonomous vehicle, etc.) that is configured to operate the vehicle 205. For example, the vehicle computing system 210 can represent or be an autonomous vehicle control system configured to perform the operations and functions described herein. Generally, the vehicle computing system 210 can obtain sensor data 255 from sensor(s) 235 (e.g., sensor(s) 115, 120 of FIG. 1, etc.) onboard the vehicle 205, attempt to comprehend the vehicle's surrounding environment by performing various processing techniques on the sensor data 255, and generate an appropriate motion plan through the vehicle's surrounding environment (e.g., environment 110 of FIG. 1, etc.).

The vehicle 205 incorporating the vehicle computing system 200 can be various types of vehicles. For instance, the vehicle 205 can be an autonomous vehicle. The vehicle 205 can be a ground-based autonomous vehicle (e.g., car, truck, bus, etc.). The vehicle 205 can be an air-based autonomous vehicle (e.g., airplane, helicopter, etc.). The vehicle 205 can be a lightweight elective vehicle (e.g., bicycle, scooter, etc.). The vehicle 205 can be another type of vehicle (e.g., watercraft, etc.). The vehicle 205 can drive, navigate, operate, etc. with minimal or no interaction from a human operator (e.g., driver, pilot, etc.). In some implementations, a human operator can be omitted from the vehicle 205 (or also omitted from remote control of the vehicle 205). In some implementations, a human operator can be included in the vehicle 205.

The vehicle 205 can be configured to operate in a plurality of operating modes. The vehicle 205 can be configured to operate in a fully autonomous (e.g., self-driving, etc.) operating mode in which the vehicle 205 is controllable without user input (e.g., can drive and navigate with no input from a human operator present in the vehicle 205 or remote from the vehicle 205, etc.). The vehicle 205 can operate in a semi-autonomous operating mode in which the vehicle 205 can operate with some input from a human operator present in the vehicle 205 (or a human operator that is remote from the vehicle 205). The vehicle 205 can enter into a manual operating mode in which the vehicle 205 is fully controllable by a human operator (e.g., human driver, pilot, etc.) and can be prohibited or disabled (e.g., temporary, permanently, etc.) from performing autonomous navigation (e.g., autonomous driving, flying, etc.). The vehicle 205 can be configured to operate in other modes such as, for example, park or sleep modes (e.g., for use between tasks/actions such as waiting to provide a vehicle service, recharging, etc.). In some implementations, the vehicle 205 can implement vehicle operating assistance technology (e.g., collision mitigation system, power assist steering, etc.), for example, to help assist the human operator of the vehicle 205 (e.g., while in a manual mode, etc.).

To help maintain and switch between operating modes, the vehicle computing system 210 can store data indicative of the operating modes of the vehicle 205 in a memory onboard the vehicle 205. For example, the operating modes can be illustrated by an operating mode data structure (e.g., rule, list, table, etc.) that indicates one or more operating parameters for the vehicle 205, while in the particular operating mode. For example, an operating mode data structure can indicate that the vehicle 205 is to autonomously plan its motion when in the fully autonomous operating mode. The vehicle computing system 210 can access the memory when implementing an operating mode.

The operating mode of the vehicle 205 can be adjusted in a variety of manners. For example, the operating mode of the vehicle 205 can be selected remotely, off-board the vehicle 205. For example, a remote computing system (e.g., of a vehicle provider, fleet manager, or service entity associated with the vehicle 205, etc.) can communicate data to the vehicle 205 instructing the vehicle 205 to enter into, exit from, maintain, etc. an operating mode. By way of example, such data can instruct the vehicle 205 to enter into the fully autonomous operating mode.

In some implementations, the operating mode of the vehicle 205 can be set onboard or near the vehicle 205. For example, the vehicle computing system 210 can automatically determine when and where the vehicle 205 is to enter, change, maintain, etc. a particular operating mode (e.g., without user input, etc.). Additionally, or alternatively, the operating mode of the vehicle 205 can be manually selected through one or more interfaces located onboard the vehicle 205 (e.g., key switch, button, etc.) or associated with a computing device within a certain distance to the vehicle 205 (e.g., a tablet operated by authorized personnel located near the vehicle 205 and connected by wire or within a wireless communication range, etc.). In some implementations, the operating mode of the vehicle 205 can be adjusted by manipulating a series of interfaces in a particular order to cause the vehicle 205 to enter into a particular operating mode.

The operations computing system 290A can include multiple components for performing various operations and functions. For example, the operations computing system 290A can be configured to monitor and communicate with the vehicle 205 or its users. This can include coordinating a vehicle service provided by the vehicle 205 (e.g., cargo delivery service, passenger transport, etc.). To do so, the operations computing system 290A can communicate with the one or more remote computing system(s) 290B or the vehicle 205 through one or more communications network(s) including the communications network(s) 220. The communications network(s) 220 can send or receive signals (e.g., electronic signals, etc.) or data (e.g., data from a computing device, etc.) and include any combination of various wired (e.g., twisted pair cable, etc.) or wireless communication mechanisms (e.g., cellular, wireless, satellite, microwave, and radio frequency, etc.) or any desired network topology (or topologies). For example, the communications network(s) 220 can include a local area network (e.g., intranet, etc.), wide area network (e.g., the Internet, etc.), wireless LAN network (e.g., through Wi-Fi, etc.), cellular network, a SATCOM network, VHF network, a HF network, a WiMAX based network, or any other suitable communications network (or combination thereof) for transmitting data to or from the vehicle 205.

Each of the one or more remote computing system(s) 290B or the operations computing system 290A can include one or more processors and one or more memory devices. The one or more memory devices can be used to store instructions that when executed by the one or more processors of the one or more remote computing system(s) 290B or operations computing system 290A cause the one or more processors to perform operations or functions including operations or functions associated with the vehicle 205 including sending or receiving data or signals to or from the vehicle 205, monitoring the state of the vehicle 205, or controlling the vehicle 205. The one or more remote computing system(s) 290B can communicate (e.g., exchange data or signals, etc.) with one or more devices including the operations computing system 290A and the vehicle 205 through the communications network(s) 220.

The one or more remote computing system(s) 290B can include one or more computing devices such as, for example, one or more operator devices associated with one or more vehicle providers (e.g., providing vehicles for use by the service entity, etc.), user devices associated with one or more vehicle passengers, developer devices associated with one or more vehicle developers (e.g., a laptop/tablet computer configured to access computer software of the vehicle computing system 210, etc.), or other devices. One or more of the devices can receive input instructions from a user or exchange signals or data with an item or other computing device or computing system (e.g., the operations computing system 290A, etc.). Further, the one or more remote computing system(s) 290B can be used to determine or modify one or more states of the vehicle 205 including a location (e.g., a latitude and longitude, etc.), a velocity, an acceleration, a trajectory, a heading, or a path of the vehicle 205 based in part on signals or data exchanged with the vehicle 205. In some implementations, the operations computing system 290A can include the one or more remote computing system(s) 290B.

The vehicle computing system 210 can include one or more computing devices located onboard the vehicle 205. For example, the computing device(s) can be located on or within the vehicle 205. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 205 (e.g., its computing system, one or more processors, etc.) to perform operations and functions, such as those described herein for collecting and processing sensor data in a streaming manner, performing autonomy functions, controlling the vehicle 205, communicating with other computing systems, etc.

The vehicle 205 can include a communications system 215 configured to allow the vehicle computing system 210 (and its computing device(s)) to communicate with other computing devices. The communications system 215 can include any suitable components for interfacing with one or more communications network(s) 220, including, for example, transmitters, receivers, ports, controllers, antennas, or other suitable components that can help facilitate communication. In some implementations, the communications system 215 can include a plurality of components (e.g., antennas, transmitters, or receivers, etc.) that allow it to implement and utilize multiple-input, multiple-output (MIMO) technology and communication techniques. The vehicle computing system 210 can use the communications system 215 to communicate with one or more computing devices that are remote from the vehicle 205 over the communication network(s) 220 (e.g., through one or more wireless signal connections, etc.).

As shown in FIG. 2, the vehicle computing system 210 can include the one or more sensors 235, the autonomy computing system 240, the vehicle interface 245, the one or more vehicle control systems 250, and other systems, as described herein. One or more of these systems can be configured to communicate with one another through one or more communication channels. The communication channel(s) can include one or more data buses (e.g., controller area network (CAN), etc.), on-board diagnostics connector (e.g., OBD-II, etc.), or a combination of wired or wireless communication links. The onboard systems can send or receive data, messages, signals, etc. amongst one another through the communication channel(s).

In some implementations, the sensor(s) 235 can include one or more LIDAR sensor(s). The sensor(s) 235 can be configured to generate point data descriptive of a portion of a three-hundred-and-sixty-degree view of the surrounding environment of the robot. The point data can be three-dimensional LIDAR point cloud data. In some implementations, one or more sensors 235 for capturing depth information can be fixed to a rotational device in order to rotate the sensor(s) about an axis. The sensor(s) 235 can be rotated about the axis while capturing data in interval sector packets descriptive of different portions of a three-hundred-and-sixty-degree view of a surrounding environment of the vehicle 205. In some implementations, one or more sensors 235 for capturing depth information can be solid state.

In some implementations, the sensor(s) 235 can include at least two different types of sensor(s). For instance, the sensor(s) 235 can include at least one first sensor (e.g., the first sensor(s) 115, etc.) and at least one second sensor (e.g., the second sensor(s) 120, etc.). The at least one first sensor can be a different type of sensor than the at least one second sensor. For example, the at least one first sensor can include one or more image capturing device(s) (e.g., one or more cameras, RGB cameras, etc.). In addition, or alternatively, the at least one second sensor can include one or more depth capturing device(s) (e.g., LIDAR sensor, etc.). The at least two different types of sensor(s) can obtain sensor data indicative of one or more static or dynamic objects within an environment of the vehicle 205.

The sensor(s) 235 can be configured to acquire sensor data 255. The sensor(s) 235 can be external sensors configured to acquire external sensor data. This can include sensor data associated with the surrounding environment of the vehicle 205. The surrounding environment of the vehicle 205 can include/be represented in the field of view of the sensor(s) 235. For instance, the sensor(s) 235 can acquire image or other data of the environment outside of the vehicle 205 and within a range or field of view of one or more of the sensor(s) 235. This can include different types of sensor data acquired by the sensor(s) 235 such as, for example, data from one or more LIDAR systems, one or more RADAR systems, one or more cameras (e.g., visible spectrum cameras, infrared cameras, etc.), one or more motion sensors, one or more audio sensors (e.g., microphones, etc.), or other types of imaging capture devices or sensors. The sensor data 255 can include image data (e.g., 2D camera data, video data, etc.), RADAR data, LIDAR data (e.g., 3D point cloud data, etc.), audio data, or other types of data. The one or more sensors can be located on various parts of the vehicle 205 including a front side, rear side, left side, right side, top, or bottom of the vehicle 205. The vehicle 205 can also include other sensors configured to acquire data associated with the vehicle 205 itself. For example, the vehicle 205 can include inertial measurement unit(s), wheel odometry devices, or other sensors.

The sensor data 255 can be indicative of one or more objects within the surrounding environment of the vehicle 205. The object(s) can include, for example, vehicles, pedestrians, bicycles, or other objects. The object(s) can be located in front of, to the rear of, to the side of, above, below the vehicle 205, etc. The sensor data 255 can be indicative of locations associated with the object(s) within the surrounding environment of the vehicle 205 at one or more times. The object(s) can be static objects (e.g., not in motion, etc.) or dynamic objects/actors (e.g., in motion or likely to be in motion, etc.) in the vehicle's environment. The sensor data 255 can also be indicative of the static background of the environment. The sensor(s) 235 can provide the sensor data 255 to the autonomy computing system 240, the remote computing system(s) 290B, or the operations computing system 290A.

In addition to the sensor data 255, the autonomy computing system 240 can obtain map data 260. The map data 260 can provide detailed information about the surrounding environment of the vehicle 205 or the geographic area in which the vehicle was, is, or will be located. For example, the map data 260 can provide information regarding: the identity and location of different roadways, road segments, buildings, or other items or objects (e.g., lampposts, crosswalks or curb, etc.); the location and directions of traffic lanes (e.g., the location and direction of a parking lane, a turning lane, a bicycle lane, or other lanes within a particular roadway or other travel way or one or more boundary markings associated therewith, etc.); traffic control data (e.g., the location and instructions of signage, traffic lights, or other traffic control devices, etc.); obstruction information (e.g., temporary or permanent blockages, etc.); event data (e.g., road closures/traffic rule alterations due to parades, concerts, sporting events, etc.); nominal vehicle path data (e.g., indicate of an ideal vehicle path such as along the center of a certain lane, etc.); or any other map data that provides information that assists the vehicle computing system 210 in processing, analyzing, and perceiving its surrounding environment and its relationship thereto. In some implementations, the map data 260 can include high-definition map data. In some implementations, the map data 260 can include sparse map data indicative of a limited number of environmental features (e.g., lane boundaries, etc.). In some implementations, the map data can be limited to geographic area(s) or operating domains in which the vehicle 205 (or autonomous vehicles generally) may travel (e.g., due to legal/regulatory constraints, autonomy capabilities, or other factors, etc.).

The vehicle 205 can include a positioning system 265. The positioning system 265 can determine a current position of the vehicle 205. This can help the vehicle 205 localize itself within its environment. The positioning system 265 can be any device or circuitry for analyzing the position of the vehicle 205. For example, the positioning system 265 can determine position by using one or more of inertial sensors (e.g., inertial measurement unit(s), etc.), a satellite positioning system, based on IP address, by using triangulation or proximity to network access points or other network components (e.g., cellular towers, WiFi access points, etc.) or other suitable techniques. The position of the vehicle 205 can be used by various systems of the vehicle computing system 210 or provided to a remote computing system. For example, the map data 260 can provide the vehicle 205 relative positions of the elements of a surrounding environment of the vehicle 205. The vehicle 205 can identify its position within the surrounding environment (e.g., across six axes, etc.) based at least in part on the map data 260. For example, the vehicle computing system 210 can process the sensor data 255 (e.g., LIDAR data, camera data, etc.) to match it to a map of the surrounding environment to get an understanding of the vehicle's position within that environment. Data indicative of the vehicle's position can be stored, communicated to, or otherwise obtained by the autonomy computing system 240.

The autonomy computing system 240 can perform various functions for autonomously operating the vehicle 205. For example, the autonomy computing system 240 can perform the following functions: perception 270A, prediction 270B, and motion planning 270C. For example, the autonomy computing system 240 can obtain the sensor data 255 through the sensor(s) 235, process the sensor data 255 (or other data) to perceive its surrounding environment, predict the motion of objects within the surrounding environment, and generate an appropriate motion plan through such surrounding environment. In some implementations, these autonomy functions can be performed by one or more sub-systems such as, for example, a perception system, a prediction system, a motion planning system, or other systems that cooperate to perceive the surrounding environment of the vehicle 205 and determine a motion plan for controlling the motion of the vehicle 205 accordingly. In some implementations, one or more of the perception, prediction, or motion planning functions 270A, 270B, 270C can be performed by (or combined into) the same system or through shared computing resources. In some implementations, one or more of these functions can be performed through different sub-systems. As further described herein, the autonomy computing system 240 can communicate with the one or more vehicle control systems 250 to operate the vehicle 205 according to the motion plan (e.g., through the vehicle interface 245, etc.).

The vehicle computing system 210 (e.g., the autonomy computing system 240, etc.) can identify one or more objects that are within the surrounding environment of the vehicle 205 based at least in part on the sensor data 255 or the map data 260. The objects perceived within the surrounding environment can be those within the field of view of the sensor(s) 235 or predicted to be occluded from the sensor(s) 235. This can include object(s) not in motion or not predicted to move (static objects) or object(s) in motion or predicted to be in motion (dynamic objects/actors). The vehicle computing system 210 (e.g., performing the perception function 270C, using a perception system, etc.) can process the sensor data 255, the map data 260, etc. to obtain perception data 275A. The vehicle computing system 210 can generate perception data 275A that is indicative of one or more states (e.g., current or past state(s), etc.) of one or more objects that are within a surrounding environment of the vehicle 205. For example, the perception data 275A for each object can describe (e.g., for a given time, time period, etc.) an estimate of the object's: current or past location (also referred to as position); current or past speed/velocity; current or past acceleration; current or past heading; current or past orientation; size/footprint (e.g., as represented by a bounding shape, object highlighting, etc.); class (e.g., pedestrian class vs. vehicle class vs. bicycle class, etc.), the uncertainties associated therewith, or other state information. The vehicle computing system 210 can utilize one or more algorithms or machine-learned model(s) that are configured to identify object(s) based at least in part on the sensor data 255. This can include, for example, one or more neural networks trained to identify object(s) within the surrounding environment of the vehicle 205 and the state data associated therewith. The perception data 275A can be utilized for the prediction function 270B of the autonomy computing system 240.

The vehicle computing system 210 can be configured to predict a motion of the object(s) within the surrounding environment of the vehicle 205. For instance, the vehicle computing system 210 can generate prediction data 275B associated with such object(s). The prediction data 275B can be indicative of one or more predicted future locations of each respective object. For example, the prediction function 270B can determine a predicted motion trajectory along which a respective object is predicted to travel over time. A predicted motion trajectory can be indicative of a path that the object is predicted to traverse and an associated timing with which the object is predicted to travel along the path. The predicted path can include or be made up of a plurality of way points. In some implementations, the prediction data 275B can be indicative of the speed or acceleration at which the respective object is predicted to travel along its associated predicted motion trajectory. The vehicle computing system 210 can utilize one or more algorithms or machine-learned model(s) that are configured to predict the future motion of object(s) based at least in part on the sensor data 255, the perception data 275A, map data 260, or other data. This can include, for example, one or more neural networks trained to predict the motion of the object(s) within the surrounding environment of the vehicle 205 based at least in part on the past or current state(s) of those objects as well as the environment in which the objects are located (e.g., the lane boundary in which it is travelling, etc.). The prediction data 275B can be utilized for the motion planning function 270C of the autonomy computing system 240.

The vehicle computing system 210 can determine a motion plan for the vehicle 205 based at least in part on the perception data 275A, the prediction data 275B, or other data. For example, the vehicle computing system 210 can generate motion planning data 275C indicative of a motion plan. The motion plan can include vehicle actions (e.g., speed(s), acceleration(s), other actions, etc.) with respect to one or more of the objects within the surrounding environment of the vehicle 205 as well as the objects' predicted movements. The motion plan can include one or more vehicle motion trajectories that indicate a path for the vehicle 205 to follow. A vehicle motion trajectory can be of a certain length or time range. A vehicle motion trajectory can be illustrated by one or more waypoints (with associated coordinates). The way point(s) can be future locations for the vehicle 205. The planned vehicle motion trajectories can indicate the path the vehicle 205 is to follow as it traverses a route from one location to another. Thus, the vehicle computing system 210 can take into account a route and/or route data when performing the motion planning function 270C.

The vehicle computing system 210 can implement an optimization algorithm, machine-learned model, etc. that considers cost data associated with a vehicle action as well as other objective functions (e.g., cost functions based on speed limits, traffic lights, etc.), if any, to determine optimized variables that make up the motion plan. The vehicle computing system 210 can determine that the vehicle 205 can perform a certain action (e.g., pass an object, etc.) without increasing the potential risk to the vehicle 205 or violating any traffic laws (e.g., speed limits, lane boundaries, signage, etc.). For instance, the vehicle computing system 210 can evaluate the predicted motion trajectories of one or more objects during its cost data analysis to help determine an optimized vehicle trajectory through the surrounding environment. The motion planning function 270C can generate cost data associated with such trajectories. In some implementations, one or more of the predicted motion trajectories or perceived objects may not ultimately change the motion of the vehicle 205 (e.g., due to an overriding factor, etc.). In some implementations, the motion plan may illustrate the vehicle's motion such that the vehicle 205 avoids the object(s), reduces speed to give more leeway to one or more of the object(s), proceeds cautiously, performs a stopping action, passes an object, queues behind/in front of an object, etc.

The vehicle computing system 210 can be configured to continuously update the vehicle's motion plan and corresponding planned vehicle motion trajectories. For example, in some implementations, the vehicle computing system 210 can generate new motion planning data 275C/motion plan(s) for the vehicle 205 (e.g., multiple times per second, etc.). Each new motion plan can describe a motion of the vehicle 205 over the next planning period (e.g., waypoints/locations (s) over the next several seconds, etc.). Moreover, a motion plan may include a planned vehicle motion trajectory. The motion trajectory can be indicative of the future planned location(s), waypoint(s), heading, velocity, acceleration, etc. In some implementations, the vehicle computing system 210 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 205.

The vehicle computing system 210 can cause the vehicle 205 to initiate a motion control in accordance with at least a portion of the motion planning data 275C. A motion control can be an operation, action, etc. that is associated with controlling the motion of the vehicle 205. For instance, the motion planning data 275C can be provided to the vehicle control system(s) 250 of the vehicle 205. The vehicle control system(s) 250 can be associated with a vehicle interface 245 that is configured to implement a motion plan. The vehicle interface 245 can serve as an interface/conduit between the autonomy computing system 240 and the vehicle control systems 250 of the vehicle 205 and any electrical/mechanical controllers associated therewith. The vehicle interface 245 can, for example, translate a motion plan into instructions for the appropriate vehicle control component (e.g., acceleration control, brake control, steering control, etc.). By way of example, the vehicle interface 245 can translate a determined motion plan into instructions to adjust the steering of the vehicle 205 "X" degrees, apply a certain magnitude of braking force, increase/decrease speed, etc. The vehicle interface 245 can help facilitate the responsible vehicle control (e.g., braking control system, steering control system, acceleration control system, etc.) to execute the instructions and implement a motion plan (e.g., by sending control signal(s), making the translated plan available, etc.). This can allow the vehicle 205 to autonomously travel within the vehicle's surrounding environment.

The vehicle computing system 210 can store other types of data. For example, an indication, record, or other data indicative of the state of the vehicle (e.g., its location, motion trajectory, health information, etc.), the state of one or more users (e.g., passengers, operators, etc.) of the vehicle, or the state of an environment including one or more objects (e.g., the physical dimensions or appearance of the one or more objects, locations, predicted motion, etc.) can be stored locally in one or more memory devices of the vehicle 205. Additionally, the vehicle 205 can communicate data indicative of the state of the vehicle, the state of one or more passengers of the vehicle, or the state of an environment to a computing system that is remote from the vehicle 205, which can store such information in one or more memories remote from the vehicle 205. Moreover, the vehicle 205 can provide any of the data created or store onboard the vehicle 205 to another vehicle.

The vehicle computing system 210 can include the one or more vehicle user devices 280. For example, the vehicle computing system 210 can include one or more user devices with one or more display devices located onboard the vehicle 205. A display device (e.g., screen of a tablet, laptop, smartphone, etc.) can be viewable by a user of the vehicle 205 that is located in the front of the vehicle 205 (e.g., driver's seat, front passenger seat, etc.). Additionally, or alternatively, a display device can be viewable by a user of the vehicle 205 that is located in the rear of the vehicle 205 (e.g., a back passenger seat, etc.). The user device(s) associated with the display devices can be any type of user device such as, for example, a tablet, mobile phone, laptop, etc. The vehicle user device(s) 280 can be configured to function as human-machine interfaces. For example, the vehicle user device(s) 280 can be configured to obtain user input, which can then be utilized by the vehicle computing system 210 or another computing system (e.g., a remote computing system, etc.). For example, a user (e.g., a passenger for transportation service, a vehicle operator, etc.) of the vehicle 205 can provide user input to adjust a destination location of the vehicle 205. The vehicle computing system 210 or another computing system can update the destination location of the vehicle 205 and the route associated therewith to reflect the change indicated by the user input.

As described herein, with reference to the remaining figures, the autonomy computing system 240 can utilize one or more machine-learned models to perform the perception 270A, prediction 270B, or motion planning 270C functions. The machine-learned model(s) can be previously trained through one or more machine-learned techniques. The machine-learned models can be previously trained by the one or more remote computing system(s) 290B, the operations computing system 290A, or any other device (e.g., remote servers, training computing systems, etc.) remote from or onboard the vehicle 205. For example, the one or more machine-learned models can be learned by a training computing system over training data stored in a training database. The training data can include, for example, sequential sensor data indicative of an environment (and objects/features within) at different time steps. In some implementations, the training data can include a plurality of environments previously recorded by the autonomous vehicle with one or more objects, static object(s) or dynamic object(s).

To help improve the performance of an autonomous vehicle, such as an autonomous vehicle of FIG. 2, the technology of present disclosure can leverage sensor data packet processing to generate updated spatial data of a surrounding environment. Using the technology of the present disclosure, a sensor data packet can be processed to generate a two-dimensional representation, which can be processed to generate a local feature map which is then used to update a spatial map for object determination, or detection.

Figure 3:
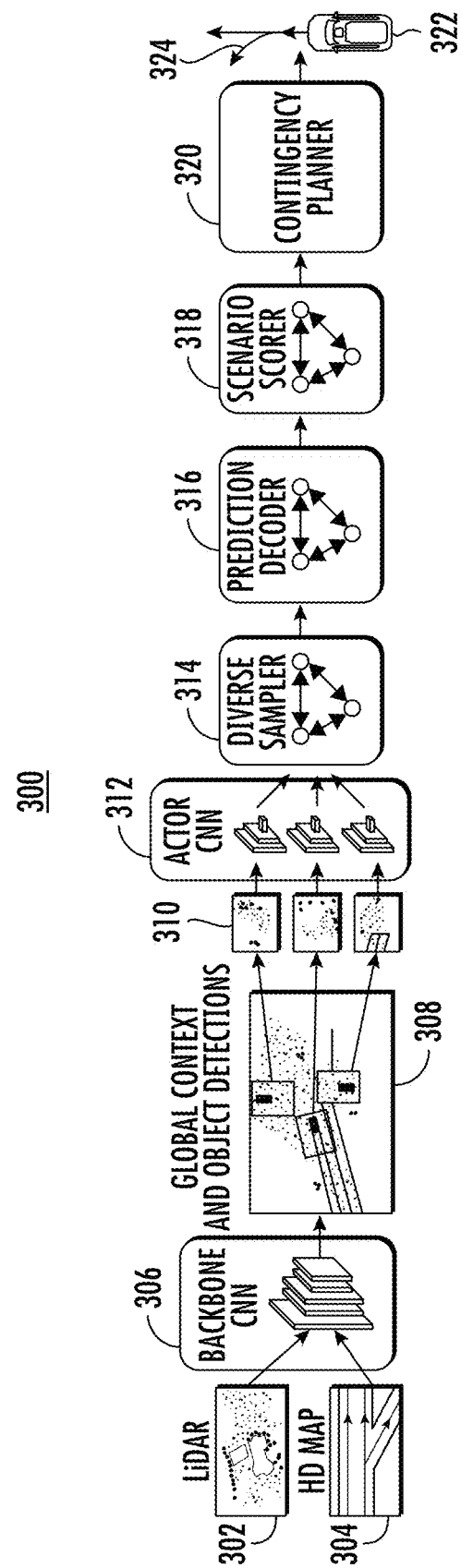
FIG. 3 is a block diagram of a sensor data processing architecture, according to some implementations of the present disclosure.

For example, FIG. 3 depicts an example system 300 configured to predict future motion/traffic scenarios within the surrounding environment of a system such as an autonomous vehicle, according to some implementations of the present disclosure. As further described herein, the network architecture can be indicative of at least a portion of an environment in which an autonomous vehicle operates. The system 300 can include any of the system(s) (e.g., autonomous vehicle 105, vehicle 205, vehicle computing system 210, remote computing system 290B, operations computing system 290A, etc.) described herein such as, for example, with reference to FIGS. 1, 2, etc. The system 300 can be configured to process sensor data to determine a plurality of actors and predict their motion descriptive of a plurality of future traffic scenarios in the surrounding environment.

To do so, the system 300 can use multiple inputs. For example, the system 300 can have at least one LIDAR input 302, (e.g., bird's eye view (BEV) voxelized LIDAR sweeps, etc.) to a backbone convolutional neural network 306. As a further example, the system 300 can have at least one HD map input 304, (e.g., BEV raster HD map) to the backbone convolutional neural network 306. In some instances, a perspective outside of BEV can be used. In particular, the LIDAR input 302 and the HD map input 304 can have the same spatial resolution. Even more particularly, the LIDAR input 302 and the HD map input 304 can have the same coordinate system. In some implementations, the LIDAR input 302 and the HD map input 304 can be fused together (e.g., by concatenation) for subsequent processing by the system 300.

In some implementations, the backbone convolutional neural network (CNN) 306 can extract a set of spatial features from the at least one LIDAR input 302 and the at least one HD map input 304. Even more particularly, multi-class object detection can be performed by the backbone CNN 306. Specifically, multi-class object detection can be performed to recognize actors (e.g., vehicles, pedestrians, bicyclists, etc.) in the fused extracted features to produce a global context and object detections 308.

In some implementations, after locating the actors in the extracted features, a rotated region of interest (RoI) align can be applied. In particular, the rotated RoI align can be applied to extract small feature crops 310 from the scene context around the actors' locations.

In some implementations, the small feature crops 310 can be input to an actor convolutional neural network 312. In particular, the actor convolutional neural network 312 can leverage max-pooling to reduce the small feature crop 310 of each actor into a feature vector. For example, $Y=\{y_1, y_2, \ldots, y_n\}$ can symbolize the future trajectories of each actor. In particular, each trajectory can be composed of a temporal series of the actor centroids. Even more particularly, each trajectory can be composed of a temporal series of the actor centroids in 2-dimensional Euclidean space (e.g., $y_n \in \mathbb{R}^{2T}$). For instance, each trajectory can be predicted in an actor-relative coordinate frame in BEV delineated by its centroid and heading.

In some implementations, a latent variable model can characterize the joint distribution over actors' trajectories. For example, $p(Y|X)=\int_z p(Y|X,Z)p(Z)dZ$, where $Z=\{z_1, z_2, \ldots, z_n\}$ can be a set of continuous latent variables. In particular, the set of continuous latent variables can capture latent scene dynamics. Even more particularly, a fixed prior $p(Z)=\Pi_{n=1}^{N} p(zn)$ can be assumed, where $z_n \sim N(0,1) \in \mathbb{R}^L$.

In some implementations, an implicit decoder (e.g., $Y=f_\theta(X, Z)$) can be adopted. In particular, a deterministic function parameterized by a graph neural network can be used (e.g., $f_\theta$).

In some implementations, (X,Y) pairs of data can be obtained. In particular, a posterior or encoder function (e.g., $q_\varphi$) can be introduced. Even more particularly, the posterior or encoder function can be introduced to approximate the true posterior distribution (e.g., $p(Z|X,Y)$). For instance, the true posterior distribution can be approximated during training, wherein the true posterior distribution can be parameterized by a graph neural network. In particular, the encoder function can learn a decoder.

In some implementations, the backbone convolutional neural network 306, actor convolutional neural network 312, encoder, and decoder can be trained jointly for the tasks of object detection and motion forecasting. In particular, object detection can be trained via multi-task loss. Even more particularly, a standard cross-entropy with hard negative mining can be used. Specifically, the classification loss can be summed over all locations on the output map. Even more specifically, the regression loss can be computed over positive locations only. For example, to stabilize the training process, the focal loss can user a particular hyper-parameter such that all the samples are re-weighted. Specifically, due to the deterministic decoder leading to an implicit distribution over Y, a Huber loss can be used as the reconstruction loss such that the KL term can be reweighted. As another example, a biased sampling strategy for positive samples can be used.

In some implementations, motion forecasting can be trained following a conditional variational auto-encoder (CVAE). In particular, the CVAE can be a conditional directed graphical model whose input observations can modulate the prior on Gaussian latent variables that generate the outputs. Even more particularly, the CVAE can be trained to maximize the conditional log-likelihood. Even more particularly, the variational learning objective of the CVAE can be formulated in the framework of stochastic gradient variational Bayes. Specifically, the CVAE framework can optimize the evidence lower bound (ELBO) of the log-likelihood (e.g., log p(Y|X)).

$$L_{forecast} = \frac{1}{NT} \sum_{n}^{N} \sum_{t}^{T} l_\delta(y_n^t - y_{n,GT}^t) + \beta \cdot KL(q_\varphi(Z|X, Y = Y_{GT}) \| P(Z))$$

In some implementations, the first term in the above referenced formula can minimize the reconstruction error. In particular the first term can minimize the reconstruction error between all the trajectories in a scene (e.g., $Y=\{y_n^t | \forall \bar{n},t\}=f_\theta(X,Z), Z \sim q_\phi(Z|X, Y=Y_{GT}))$ and their corresponding ground-truth (e.g., $Y_{GT}$). Even more particularly, the second term in the above referenced formula can bring the privileged posterior (e.g., $q_\phi(Z|X, Y=Y_{GT})$) and the prior (e.g., p(Z)) closer.

In some implementations, the sensor data from the at least one LIDAR input 302 and the at least one HD map input 304 can be encoded into actor contexts (e.g., X) with the backbone convolutional neural network 306 and object detector. In particular, the prior $Z_k \sim p(Z)$ can be sampled a particular number of times (e.g., K). Even more particularly, the scene latent samples can be decoded deterministically. For example, the scene latent samples can be decoded deterministically in parallel (e.g., to obtain each of the K futures $Y_k=f_\theta(X, Z_k)$).

In some implementations, the output data of the actor convolutional neural network 312 can be input into a diverse sampler 314. The diverse sampler 314 will be discussed in greater detail with respect to FIG. 5B.

In some implementations, the diverse set of particular number (e.g., K) of future trajectory realizations (e.g., $Y=\{Y_1, \ldots, Y_K\}$) can provide the coverage for motion planning. In particular, for risk assessment, the probability distribution over each future realization in the set can be estimated. Even more particularly, the probability distribution over each future realization in the set can be estimated by augmenting scenario scorer model 318 to also output a score for all future realizations (e.g., $\ell=s_\varphi(X, Y)$, where scenario scorer model 318 (e.g., $s_\varphi$) can be a GNN that takes as input the actor features and all sample future scenarios. Specifically, a distribution can be recovered over such scores. Even more specifically, a probability of each sample can be defined. For example, the probability of each sample can be defined by:

$$p_\psi(Y_k|X) = \frac{\exp(\ell_k)}{\Sigma_{k'} \exp(\ell_{k'})}$$

In some implementations, the scenario scorer model 318 (e.g., $s_\varphi$) can be trained to match the approximate categorical distribution over future scenarios (e.g., $q(Y_k|X)$) under the divergence (e.g., $KL p_\psi(Y_k|X)$). For example, the approximate distribution can be illustrated as follows:

$$q(Y_k|X) = \frac{\exp(-\alpha\, l_2(Y_k - Y_{GT}))}{\Sigma_{k'} \exp(-\alpha\, l_2(Y_k' - Y_{GT}))}$$

Continuing the example from above, $\alpha$ can be a temperature hyperparameter chosen empirically. For example, $\alpha=10$.

In some implementations, a contingency planner 320 can generate a single immediate action 322. In particular, the contingency planner 320 can generate a subsequent trajectory 324 for each future realization. Even more specifically, the subsequent trajectory 324 for each future realization can be a proper contingent plan for each future realizations. For example, the contingency planner can be illustrated as follows:

$$\tau_{0:t}^* = \underset{\tau_{0:t} \in T_{0:t}(x_0)}{\operatorname{argmin}} \left( \max_Y c(\tau_{0:t}, Y) + \sum_{Y_i \in Y} P(Y_i) g(\tau_{0:t}^t, Y_i) \right)$$

$$g(x, Y) = \min_{\tau_{t:T} \in T_{t:T}(x)} c(\tau_{t:T}, Y)$$

Continuing the example from above, $g(\tau^t, Y)$ can represent a minimum cost trajectory from time t to T starting from the state $\tau^t$. In particular, a single future realization (e.g., Y) can be assumed. Even more particularly, an immediate action $\tau_{0:t}$ can be found that satisfies short-term performance objectives to all the possible realizations (e.g., Y) and leads to a comfortable diversion to a contingent trajectory that is specifically planned for a single future realization. Specifically, such decision-postponing can avoid over-conservative behaviors while staying sage until more information is obtained. Even more specifically, possible realizations can be covered, regardless of their likelihood.

In some implementations, a planner cost function can be used in the contingency planner 320 where the planner cost function can be a linear combination of various subcosts that encode different aspects of driving (e.g., comfort, traffic-rules, route, etc.) In particular, collision subcosts can personalize an SDV trajectory if it overlaps with the predicted trajectories of other actors or has high speed in close distance to them. Even more particularly, trajectories that violate a headway buffer to the lead vehicle can be penalized.

In some implementations, other subcosts can promote driving within a boundary of the lane and road. In particular, trajectories that go above speed-limits or violate a red-traffic light can be penalized.

In some implementations, certain trajectories can be penalized based on comfort. For example, motion jerk, high forward acceleration, deceleration, and lateral acceleration can be penalized to promote comfortable maneuvers for the SDV.

In some implementations, a sampling approach can be taken in the contingency planner 320 to solve minimization (e.g., minimization used in the actor convolutional neural network 312). In particular, a set of pairs can be generated which include possible short-term trajectories (e.g., single immediate action 322) and their possible subsequent set of trajectories 324. Specifically, a dense set of initial actions can be considered such that the final executed trajectory can be smooth and comfortable. Specifically, a dense set of long-term trajectories can enable the contingency planner 320 to find a proper contingent plan for the future and obtain a more accurate cost-to-go for the initial action.

In some implementations, a set of paths can be generated in the sampling strategy. In particular, for each path, a set of initial velocity profiles can be sampled, creating the set of short-term trajectories. Even more particularly, another set of velocity profiles can be conditioned on the end state of these initial trajectories and sampled for the rest of the planning horizon. For example, the SDV can be assumed to follow the same path. Specifically, a sample set can contain around 240 actions and for each action another roughly 260 long-term trajectories can be associated. Even more specifically, path and velocity generation can be done in Frenet-frame of the desired lane-center. For example, the path and velocity generation can be done by sampling lateral and longitudinal profiles.

Figure 4:
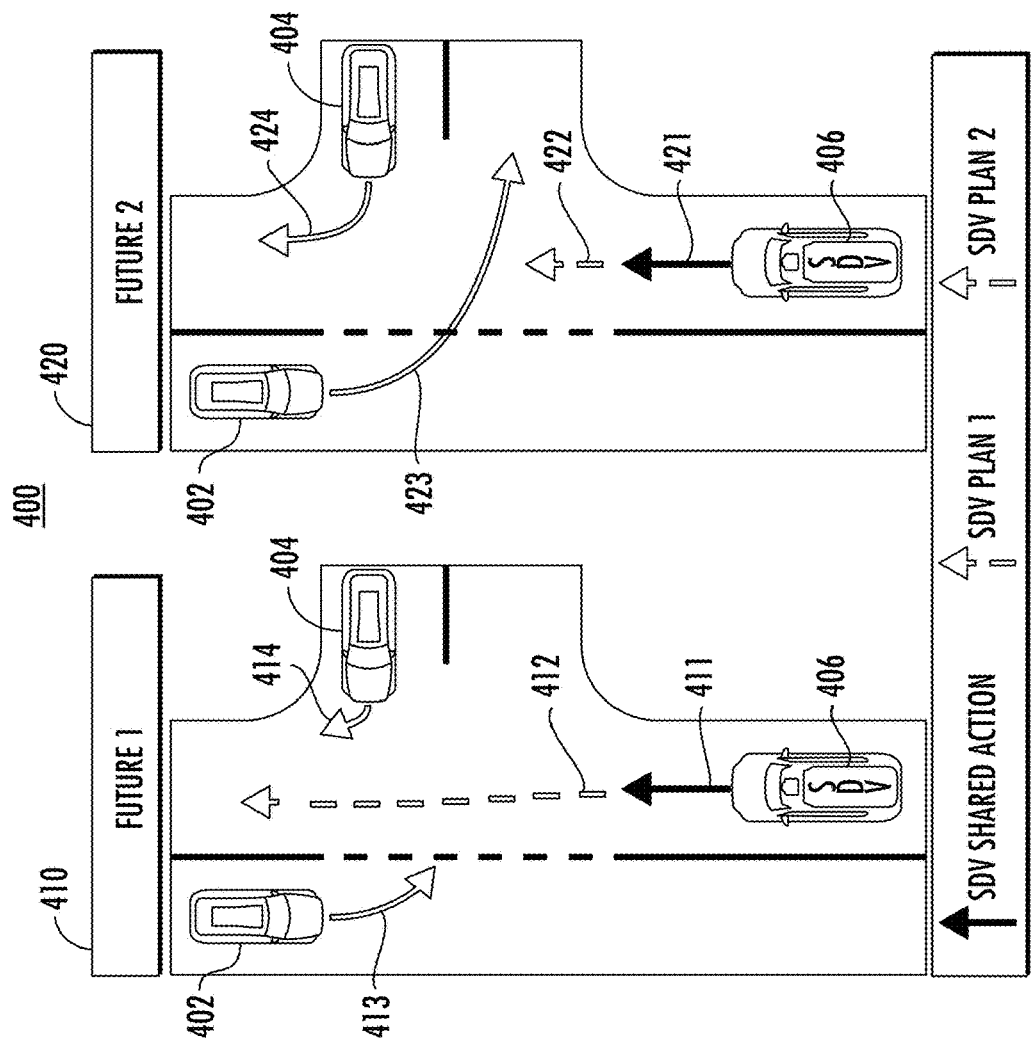
FIG. 4 is a graphical representation of first and second example future motion scenarios in an environment, according to some implementations of the present disclosure.

In some implementations, a contingency planner (e.g., contingency planner 320 of FIG. 3) can implement interactive planning or noninteractive planning, as well as combinations thereof. For example, FIG. 4 illustrates how the future is highly uncertain and multi-modal. In particular, two distinct future motion/traffic scenarios, future 1 410 and future 2 420 are illustrated at the scene-level. Even more particularly, FIG. 4 illustrates an ego-actor, such as autonomous vehicle 406, traversing a lane of a roadway. It might be desired for the autonomous vehicle 406 to continue moving forward within a lane of the roadway. However, the autonomous vehicle 406 is sharing the roadway with first object 402 and second object 404 (e.g., other dynamic actors such as other vehicles). It can be predicted (e.g., by prediction function 270B) that first object 402 may approach but not cross the path of the autonomous vehicle 406 in future 1 410 based on predicted motion 413 of first object 402. Alternatively, in future 2 420, it can be predicted (e.g., by prediction function 270B) that first object 402 may cross the path of the autonomous vehicle 406 based on predicted motion 423 of first object 402. Additionally, it can be predicted (e.g., by prediction function 270B) that second object 404 may encroach but not cross the path of the autonomous vehicle 406 in future 1 410 based on predicted motion 414 of second object 404. Alternatively, in future 2 420, it can be predicted (e.g., by prediction function 270B) that second object 404 may cross the path of the autonomous vehicle 406 based on predicted motion 424 of second object 404. Based on this prediction, for example, in response to future 1 410, the autonomous vehicle 406 can generate a first future short-term trajectory 411 and a first future long-term trajectory 412 that does not interfere with the first object 402 and second object 404. Alternatively, for example, in response to the future 2 420, the autonomous vehicle 406 can generate a second future short-term trajectory 421 and a second future long-term trajectory 422 that does not interfere with the first object 402 and second object 404. In some instances, first future short-term trajectory 411 and second future short-term trajectory 421 both correspond to the same instant action for autonomous vehicle 406, while first future long-term trajectory 412 and second future long-term trajectory 422 are different depending on subsequent actions of first object 402 and second object 404.

Figure 5A:
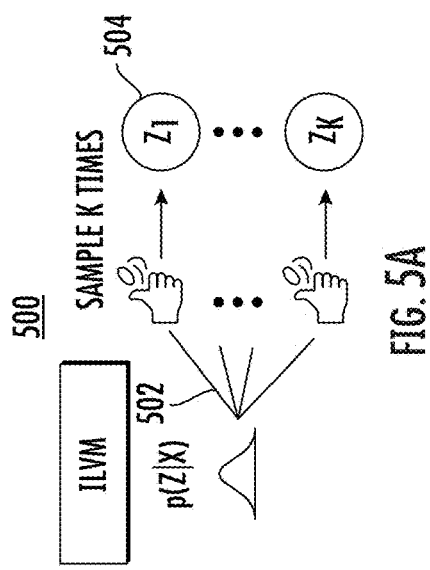
FIG. 5A is an implicit latent variable model (ILVM) for obtaining latent samples, according to some implementations of the present disclosure.
Figure 5B:
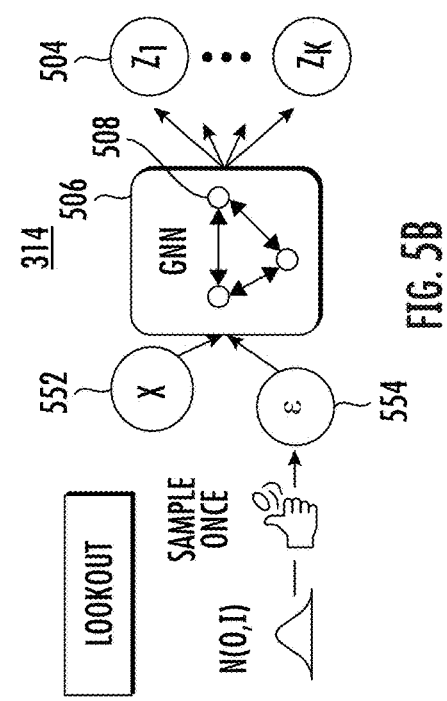
FIG. 5B is a diverse sampler using a graph neural network (GNN) for obtaining latent samples, according to some implementations of the present disclosure.

FIG. 5A illustrates how obtaining a particular number of latent samples from an implicit latent variable model implies sampling a particular number of times 502 independently from the prior. By sampling a particular number of times 502, a set of diverse scene latent samples 504 can be obtained. In contrast, FIG. 5B illustrates how the disclosed diverse sampler can exploit a GNN mapping 506 to predict a particular number of latent samples from a single noise (e.g., in parallel). In particular, the diverse sampler 314 can output a compact set of scene latent samples (e.g., Z) wherein the compact set of scene latent samples can have good coverage. Even more particularly, the diverse sampler 314 can replace the Monte Carlo sampling illustrated by FIG. 5A.

In some implementations, the diverse sampler M 314 can map the local contexts 552 (e.g., X) coming from sensor data around each actor. In particular, the diverse sampler M 314 can map the local contexts into a set of diverse scene latent samples 504 (e.g., $Z=\{Z_1, \ldots, Z_K\}$). Even more particularly, the set of diverse scene latent samples 504 can correspond to the latent dynamics of a number (e.g., K) of possible scenarios given the input sample 554. Specifically, the diverse sampler M 314 can be composed of a particular number (e.g., K) latent mappings performed by the GNN 506 (e.g., $\{M_k : k \in 1 \ldots K\}$). Even more specifically, all the latent samples (e.g., $Z_k = M_k(X, \epsilon; \eta_k)$) can be generated by mapping a shared noise (e.g., $\epsilon \sim N(0,1) \in \mathbb{R}^{NL}$, where N can represent the number of actors in a scene and L can represent the dimensionality of the latent variable $z_n$). Continuing the example, $\{\eta_k\}$ can represent the set of learnable parameters. In particular, the noise can share across latent mappings to be able to generate a joint set of latents that are distinct from each other such that they can be decoded into a set of diverse futures. Even more particularly, the set of diverse futures can summarize all possible futures.

In some implementations, the diverse sampler M 314 can be a deterministic function like an exemplary deterministic below:

$$M_k(x, \epsilon; \eta_k) = \text{diag}(A_k(X; \eta_k))\epsilon + b_k(X; \eta_k)$$

In the case of the exemplary deterministic function, $A_k(X; \eta_k) \in \mathbb{R}^{NL}$ and $b_k(X; \eta_k) \in \mathbb{R}^{NL}$. In particular, the parameterization can depend on the number of actors (e.g., N) in the scene.

In some implementations, the input (e.g., $X \in \mathbb{R}^{ND}$) can be of variable size due to the impact of the number of actors varying from scene to scene. In particular, the diverse sampler M 314 can be parameterized with a pair of GNNs 506. Even more particularly, for the first GNN 506, a fully connected graph can be considered. For example, each node 508 can be anchored to an actor. Continuing the example, each node 508 can initialize the node states. In particular, message passing can be performed. Even more particularly, message passing can be performed to aggregate information about the whole scene at each node.

In some implementations, each node 508 can predict $a_n \in \mathbb{R}^{KL}$. In particular, $a_n \in \mathbb{R}^{KL}$ can be predicted by an MLP.

Even more particularly, $A_k=[a_1^{kL:(k+1)L}, \ldots, a_N^{kL:(k+1)L}]$ can, be extracted. Even more particularly, $b_k$ can be generated using the same process as $A_k$ with a second GNN 506.

In some implementations, the diverse sampler M 314 can induce a distribution. For example, the diverse sampler M 314 can induce a distribution $p(Z|X)=\eta_{k=1}^k p(Z_k|x)$ where $p(Z_k|x)=N(b_k(x; \eta_k), A_k(x; \eta_k)A_k(x, \eta_k)^T)$.

In some implementations, the diverse latent codes Z can be deterministically decoded (e.g., via $Y_k=f_\theta(X, Z_k)$ (e.g., with a prediction decoder 316 from FIG. 3) learned by the encoder function. In particular, a set of a particular number (e.g., K) of future trajectory realizations can be obtained. Specifically, the future trajectory realizations of all actors in the scene can be obtained through parallel sampling and decoding (e.g., $Y=\{Y_1, \ldots, Y_K\}$). In particular, the sampling can be parallel. Even more particularly, the sampling can be performed by leveraging a pair of GNNs. Specifically, the pair of GNNs that perform all the sampling can perform all latent mapping. Even more specifically, the latent mapping can be performed in a single round of message passing (e.g., $Z \sim M(X, \in; \eta)$). Specifically, the latent samples can be batched to decode them in parallel (e.g., $Y=f_\theta(Z,X)$) (e.g., with the GNN 506 and prediction decoder 316 from FIG. 3 learned by the encoder function).

In some implementations, the diverse sampler M 314 can be learned by minimizing a diversity-promoting objective. In particular, the diversity-promoting objective can express desiderata for the set of diverse future scenarios (e.g., Y) while minimizing the KL divergence between all the diverse latent distributions (e.g., $p(Z=Z_k|X)$) and the prior distribution (e.g., $p(Z)$) to incur the minimum distribution shift possible (e.g., for the pretrained prediction decoder 316 from FIG. 3). For example, the objective can be as follows:

$$\min_\eta E(Y, Y_{gt}) + \beta \sum_{k=1}^k KL(p(Z_k|X)\|p(Z))$$

To continue the example, $Y=\{Y_1, \ldots, Y_K\}$, $Y_k=f_\theta(X, Z_k)$, $Z_k=M_k(X, \in; \eta_k)$ and the minimization can be with respect to learnable parameters of the pair of GNNs 506 $\eta$. In particular, the prediction decoder 316 can be fixed.

In some implementations, the diverse sampler M 314 can include features or steps associated with evaluating an energy function including one or more energy terms (e.g., a reconstruction energy term, a planning diversity energy term, a general diversity term, and/or other diversity terms intended to accomplish the objective of promoting diverse future motion scenarios). The energy function and associated terms can be configured to promote diversity among the plurality future motion scenarios. More particularly, the energy function can be composed of terms that promote the diversity while preserving data reconstruction.

For example, the energy function can be as follows:

$$E(Y, Y_{gt}) = E_r(Y, Y_{gt}) + E_p(Y + E_d(Y))$$

Where $E_r(Y)$ represents a reconstruction energy term, $E_p(Y)$ represents a planning diversity energy term, and $E_d(Y)$ represents a general diversity energy term. Continuing the example, the reconstruction energy term can consider the squared Euclidean distance between the ground truth scene trajectory and the closest predicted scene sample trajectory. For example, the computing system can use a term which ensures that what happens in reality can be captured by at least one sample $$(e.g., E_r(Y) = \min_k l_2(Y_k - Y_{gt})).$$

In some implementations, a planning diversity energy term can be incorporated to promote diverse samples that matter for the downstream task of motion planning. For example, a reward function can be maximized such as below:

$$R(Y) = \frac{1}{k}\sum_{i=1}^K \sum_{j \neq i}^K l_2(\tau_i - \tau_j)$$

Continuing the example from above, $\tau_i = \tau(Y_i)$ can refer to an SDV trajectory planned for predicted scene sample (e.g., $Y_i$) by a contingency motion planner. In particular, the optimal planned trajectory for each scene may not be differentiable with respect to the predicted scene sample (e.g., $Y_i$) Even more particularly, a REINFORCE gradient estimator can be leveraged. Specifically, the REINFORCE gradient estimator can be leveraged to express energy (e.g., $E_p$) as a function of the likelihood under the diverse sampler M 314. For example, the diverse sampler M 314 can be represented as follows:

$$E_p(Y) =$$

$$-\mathbb{E}_Y[R(Y)] \approx -\log p(Z|X)R(Y) = \frac{1}{K(K-1)}\sum_{i=1}^K \sum_{j \neq i}^K -\log p(Z_i, Z_j)l_2(\tau_i - \tau_j)$$

Continuing the example from above, $\log p(Z_i, Z_j) = \log p(Z_j) + \log p(Z_i)$ from a Monte Carlo estimation of the marginalization over Z.

In some implementations, the general diversity energy term is indicative of a self-distance energy (e.g., $E_d$) that can encourage diversity in the behaviors of all actors equally. In particular, the self-distance energy can be illustrated as the mean pairwise distance among the scene sample trajectories. For instance, the signal from planning-based diversity can be sparse depending on the scene. For example, the self-distance energy can be determined as follows:

$$E_d(Y) = \frac{1}{K(K-1)}\sum_{i=1}^K \sum_{j \neq i}^K \exp\left(-\frac{l_2(Y_i - Y_j)}{\sigma_d}\right)$$

To continue the example from above, each Y can be induced by a different noise $\in$ covering well the distribution over futures. In particular, at inference the set induced by the mode $\in=0$ can be taken to eliminate all randomness.

Figure 6:
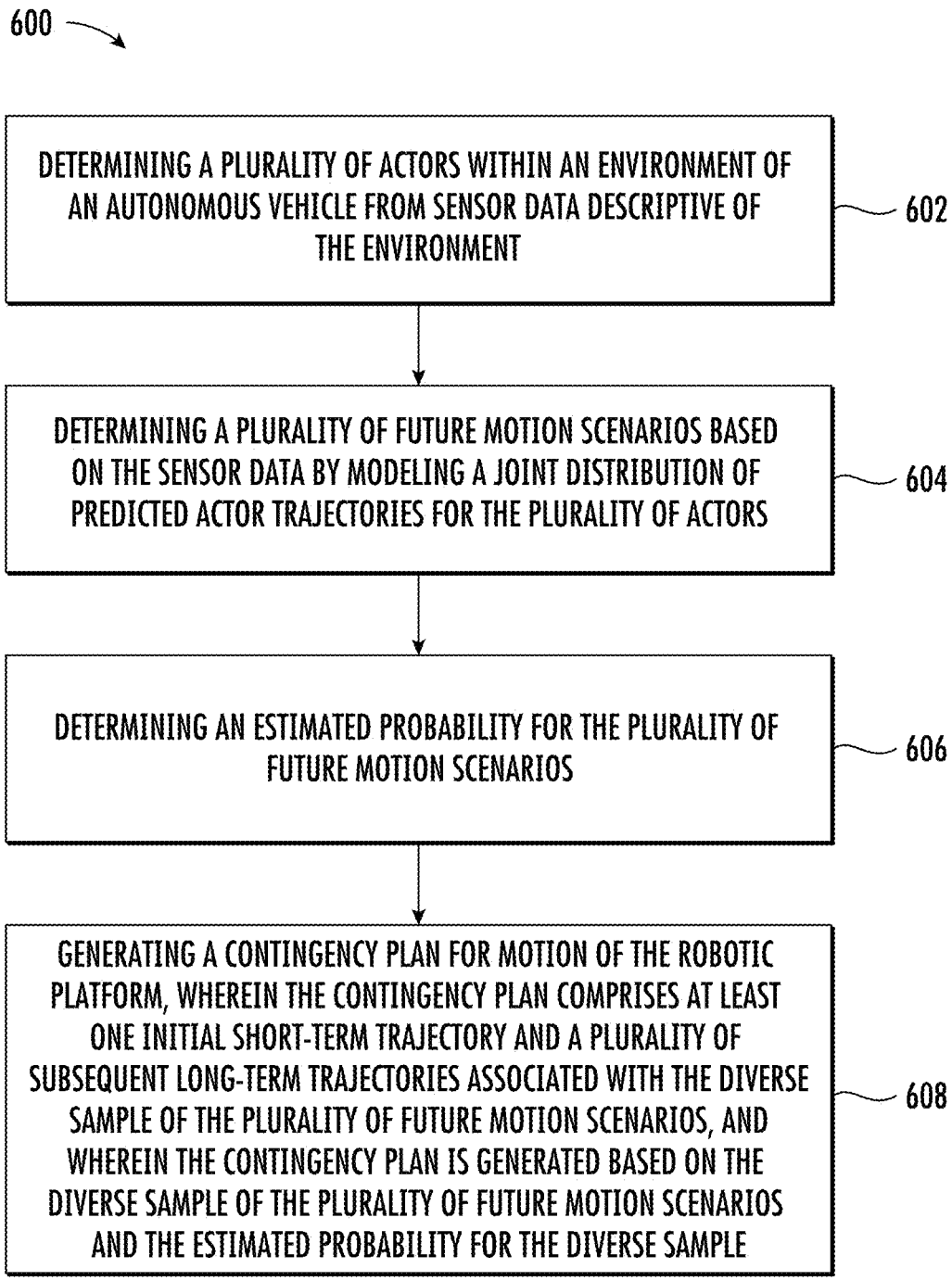
FIG. 6 is a flowchart of a method for motion forecasting and planning, according to some implementations of the present disclosure.

FIG. 6 depicts a flowchart of a method 600 for motion forecasting and planning according to aspects of the present disclosure. One or more portion(s) of the method 600 can be implemented by a computing system that includes one or more computing devices such as, for example, the computing systems described with reference to the other figures (e.g., autonomous vehicle 105, vehicle computing system 210, operations computing system(s) 290A, remote computing system(s) 290B, etc.). Each respective portion of the method 600 can be performed by any (or any combination) of one or more computing devices. Moreover, one or more portion(s) of the method 600 can be implemented as an algorithm on the hardware components of the device(s) described herein (e.g., as in FIGS. 1-3, 9, etc.), for example, to generate actor determination data and actor motion data. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 6 is described with reference to elements/terms described with respect to other systems and figures for exemplary illustrated purposes and is not meant to be limiting. One or more portions of method 600 can be performed additionally, or alternatively, by other systems.

At 602, the method 600 can include determining a plurality of actors within an environment of an autonomous vehicle from sensor data descriptive of the environment. In particular, the sensor data can be obtained of a surrounding environment by employing an autonomous vehicle (e.g., a three-hundred-and-sixty-degree view). The autonomous vehicle can include a computing system. For example, a computing system (e.g., autonomous vehicle 105, vehicle computing system 210, operations computing system(s) 290A, remote computing system(s) 290B, etc.) can obtain sensor data. As another example, the environment can include a real-world environment or a simulated environment. In some instances, the sensor data obtained at 602 can include LIDAR input 302 and HD Map input 304 as depicted in FIG. 3.

Referring still to 602, in some instances, determining a plurality of actors within the environment can include processing features from the sensor data (e.g., LIDAR data 302 of FIG. 3) and corresponding map data (e.g., HD map data 304 of FIG. 3) with a first machine-learned model (e.g., backbone CNN 306 of FIG. 3) to generate one or more object detections corresponding to the plurality of actors (e.g., object detections 308 of FIG. 3). In some instances, determining a plurality of actors within the environment can also include processing the one or more object detections (e.g., object detections 308 of FIG. 3) with a second machine-learned model (e.g., actor CNN 312 of FIG. 3) to generate a respective feature vector defining a local context for one or more of the plurality of actors.

At 604, the method 600 can include determining a plurality of future motion scenarios based on the sensor data by modeling a joint distribution of predicted actor trajectories for the plurality of actors. In some instances, determining a plurality of future motion scenarios can include evaluating a diversity objective that rewards sampling of the plurality of future motion scenarios that require distinct reactions from the autonomous vehicle. For example, the scenario scorer model 318 of FIG. 3 can evaluate a diversity objective that rewards sampling of the plurality of future motion scenarios that require distinct reactions from the autonomous vehicle. In some instances, determining a plurality of future motion scenarios can include mapping a shared noise across a joint set of latent variables that are distinct from one another to determine the plurality of future motion scenarios. For example, the diverse sampler 314 of FIG. 3 can map the shared noise. In some instances, a GNN can be employed for the mapping of the shared noise across the joint set of latent variables. For example, the diverse sampler 314 of FIG. 3 can employ a GNN.

At 606, the method 600 can include determining an estimated probability for the plurality of future motion scenarios. In some instances, determining an estimated probability for the plurality of future motion scenarios can employ a GNN to output a score corresponding to the estimated probability for the plurality of future motion scenarios. For example, the scenario scorer model 318 of FIG. 3 can employ a GNN.

At 608, the method 600 can include generating a contingency plan for motion of the autonomous vehicle, wherein the contingency plan includes at least one initial short-term trajectory and a plurality of subsequent long-term trajectories associated with the plurality of future motion scenarios, and wherein the contingency plan is generated based on the plurality of future motion scenarios and the estimated probability for the plurality of future motion scenarios. For instance, generating a contingency plan can leverage optimizing a planner cost function including a linear combination of subcosts that encode different aspects of driving, the different aspects of driving including two or more of comfort, motion rules, or route. For example, a planner cost function can be leveraged by the contingency planner 320 of FIG. 3.

Figure 7:
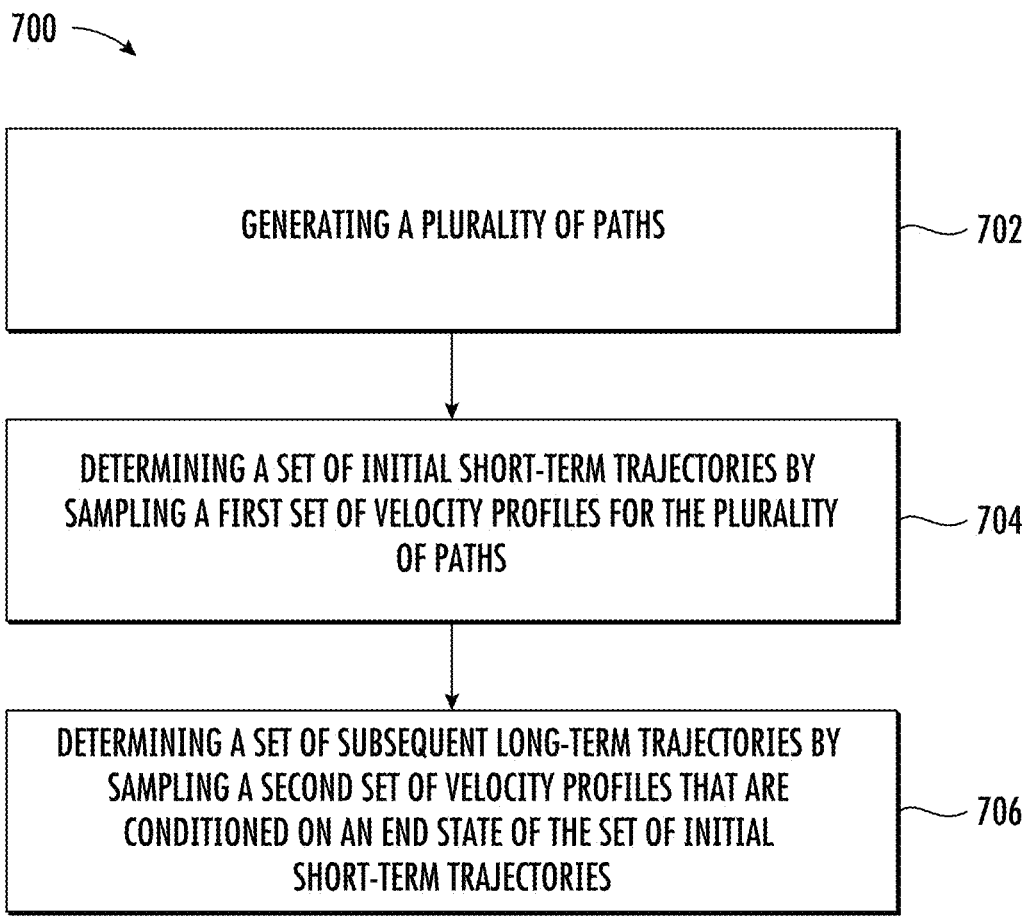
FIG. 7 is a flowchart of a method for generating a contingency plan, according to some implementations of the present disclosure.

FIG. 7 depicts a flowchart of a method 700 for generating a contingency plan according to aspects of the present disclosure. One or more portion(s) of the method 700 can be implemented by a computing system that includes one or more computing devices such as, for example, the computing systems described with reference to the other figures (e.g., autonomous vehicle 105, vehicle computing system 210, operations computing system(s) 290A, remote computing system(s) 290B, etc.). Each respective portion of the method 700 can be performed by any (or any combination) of one or more computing devices. Moreover, one or more portion(s) of the method 700 can be implemented as an algorithm on the hardware components of the device(s) described herein (e.g., as in FIGS. 1-3, 9, etc.), for example, to generate short-term and/or long-term trajectories. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 7 is described with reference to elements/terms described with respect to other systems and figures for exemplary illustrated purposes and is not meant to be limiting. One or more portions of method 700 can be performed additionally, or alternatively, by other systems. In some examples, method 700 can be implemented as part of generating a contingency plan for motion of the autonomous vehicle in 608 of FIG. 6

At 702, the method 700 can include generating a plurality of paths. For example, the contingency planner 320 of FIG. 3 can generate a plurality of paths. In particular, generating a contingency plan for motion of the robotic platform, wherein the contingency plan comprises at least one initial short-term trajectory and a plurality of subsequent long-term trajectories associated with the diverse sample of the plurality of future motion scenarios, and wherein the contingency plan is generated based on the diverse sample of the plurality of future motion scenarios and the estimated probability for the diverse sample can include generating a plurality of paths.

At 704, the method 700 can include determining a set of initial short-term trajectories by sampling a first set of velocity profiles for the plurality of paths. For example, the contingency planner 320 of FIG. 3 can determine a set of initial short-term trajectories such as 322 of FIG. 3. In particular, generating a contingency plan for motion of the robotic platform, wherein the contingency plan comprises at least one initial short-term trajectory and a plurality of subsequent long-term trajectories associated with the diverse sample of the plurality of future motion scenarios, and wherein the contingency plan is generated based on the diverse sample of the plurality of future motion scenarios and the estimated probability for the diverse sample can include determining a set of initial short-term trajectories by sampling a first set of velocity profiles for the plurality of paths.

At 706, the method 700 can include determining a set of subsequent long-term trajectories by sampling a second set of velocity profiles that are conditioned on an end state of the set of initial short-term trajectories. For example, the contingency planner 320 of FIG. 3 can determine a set of subsequent long-term trajectories such as 324 of FIG. 3. In particular, generating a contingency plan for motion of the robotic platform, wherein the contingency plan comprises at least one initial short-term trajectory and a plurality of subsequent long-term trajectories associated with the diverse sample of the plurality of future motion scenarios, and wherein the contingency plan is generated based on the diverse sample of the plurality of future motion scenarios and the estimated probability for the diverse sample can include determining a set of subsequent long-term trajectories by sampling a second set of velocity profiles that are conditioned on an end state of the set of initial short-term trajectories.

Figure 8:
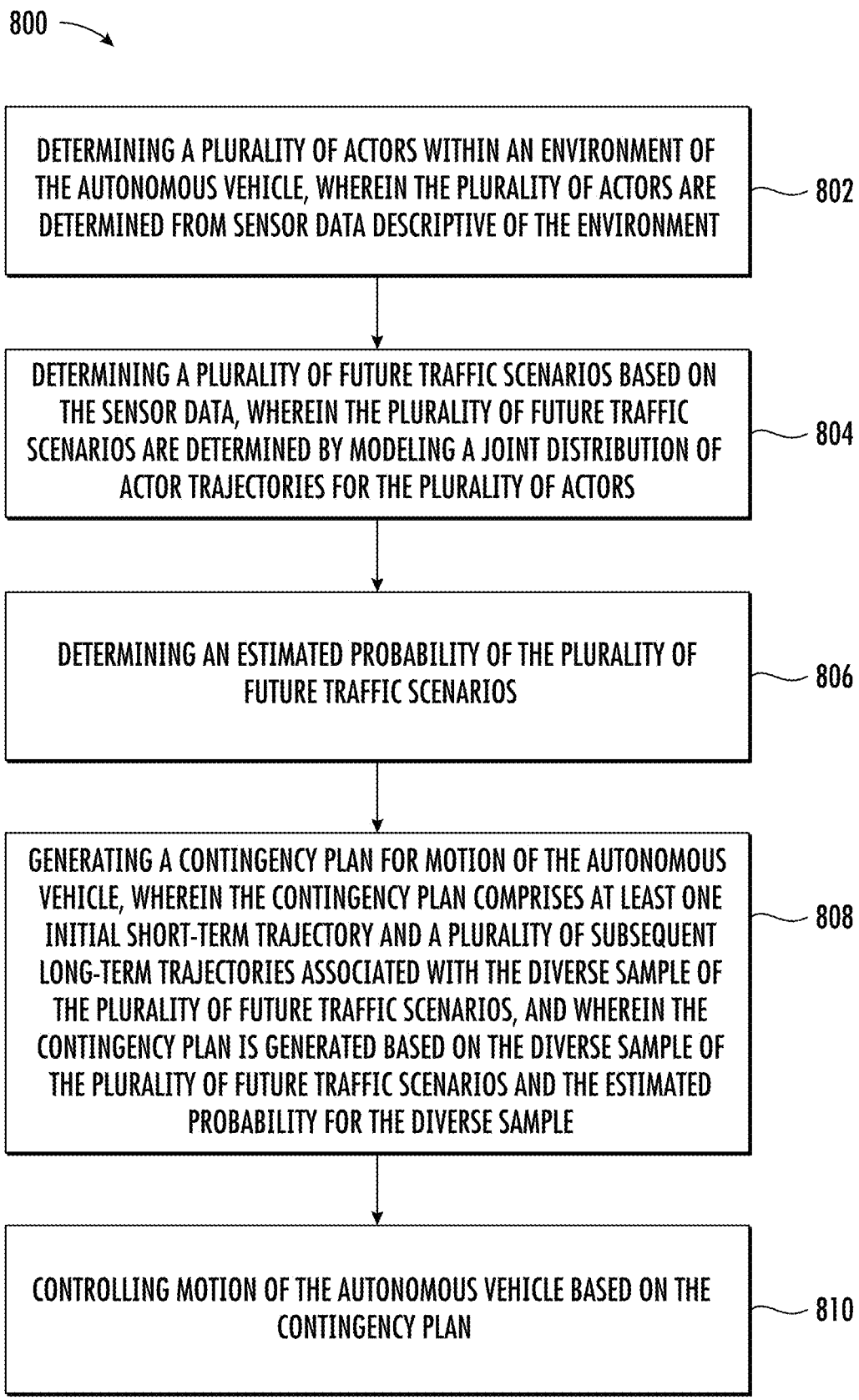
FIG. 8 is a flowchart of a method for controlling motion of an autonomous vehicle based on a contingency plan, according to some implementations of the present disclosure.

FIG. 8 depicts a flowchart of a method 800 for controlling motion of an autonomous vehicle according to aspects of the present disclosure. One or more portion(s) of the method 800 can be implemented by a computing system that includes one or more computing devices such as, for example, the computing systems described with reference to the other figures (e.g., autonomous vehicle 105, vehicle computing system 210, operations computing system(s) 290A, remote computing system(s) 290B, etc.). Each respective portion of the method 800 can be performed by any (or any combination) of one or more computing devices. Moreover, one or more portion(s) of the method 800 can be implemented as an algorithm on the hardware components of the device(s) described herein (e.g., as in FIGS. 1-3, 9, etc.), for example, to generate actor determination data and actor motion data. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 8 is described with reference to elements/terms described with respect to other systems and figures for exemplary illustrated purposes and is not meant to be limiting. One or more portions of method 800 can be performed additionally, or alternatively, by other systems.

At 802, the method 800 can include determining a plurality of actors within an environment of the autonomous vehicle, wherein the plurality of actors are determined from sensor data descriptive of the environment. In particular, the sensor data can be obtained of a surrounding environment by employing an autonomous vehicle (e.g., a three-hundred-and-sixty-degree view). The autonomous vehicle can include a computing system. For example, a computing system (e.g., autonomous vehicle 105, vehicle computing system 210, operations computing system(s) 290A, remote computing system(s) 290B, etc.) can obtain sensor data. As another example, the environment can include a real-world environment or a simulated environment. In some instances, the sensor data obtained at 702 can include LIDAR input 302 and HD Map input 304 as depicted in FIG. 3.

Referring still to 802, in some instances, determining a plurality of actors within the environment can include processing features from the sensor data (e.g., LIDAR data 302 of FIG. 3) and corresponding map data (e.g., HD map data 304 of FIG. 3) with a first machine-learned model (e.g., backbone CNN 306 of FIG. 3) to generate one or more object detections corresponding to the plurality of actors (e.g., object detections 308 of FIG. 3). In some instances, determining a plurality of actors within the environment can also include processing the one or more object detections (e.g., object detections 308 of FIG. 3) with a second machine-learned model (e.g., actor CNN 312 of FIG. 3) to generate a respective feature vector defining a local context for one or more of the plurality of actors.

At 804, the method 800 can include determining a plurality of future traffic scenarios based on the sensor data, wherein the plurality of future traffic scenarios are determined by modeling a joint distribution of actor trajectories for the plurality of actors. In some instances, determining a plurality of future traffic scenarios can include evaluating a diversity objective that rewards sampling of the plurality of future traffic scenarios that require distinct reactions from the autonomous vehicle. For example, the scenario scorer model 318 of FIG. 3 can evaluating a diversity objective that rewards sampling of the plurality of future traffic scenarios that require distinct reactions from the autonomous vehicle. In some instances, determining a plurality of future traffic scenarios can include mapping a shared noise across a joint set of latent variables that are distinct from one another to determine the plurality of future traffic scenarios. For example, the diverse sampler 314 of FIG. 3 can map the shared noise. In some instances, a GNN can be employed for the mapping of the shared noise across the joint set of latent variables. For example, the diverse sampler 314 of FIG. 3 can employ a GNN.

At 806, the method 800 can include determining an estimated probability of the plurality of future traffic scenarios. In some instances, determining an estimated probability for the plurality of future traffic scenarios can employ a GNN such that the GNN is augmented to output a score corresponding to the estimated probability for the plurality of future traffic scenarios. For example, the scenario scorer model 318 of FIG. 3 can employ a GNN.

At 808, the method 800 can include generating a contingency plan for motion of the autonomous vehicle, wherein the contingency plan includes at least one initial short-term trajectory and a plurality of subsequent long-term trajectories associated with the plurality of future traffic scenarios, and wherein the contingency plan is generated based on the plurality of future traffic scenarios and the estimated probability for the plurality of future motion scenarios. For instance, generating a contingency plan can leverage optimizing a planner cost function including a linear combination of subcosts that encode different aspects of driving, the different aspects of driving including two or more of comfort, motion rules, or route. For example, a planner cost function can be leveraged by the contingency planner 320 of FIG. 3.

At 810, the method 800 can include controlling motion of the autonomous vehicle based on the contingency plan. For example, controlling motion of the autonomous vehicle can be implemented by one or more of the motion planning system 270C, the vehicle interface 245 and/or the vehicle control system 250 as depicted in FIG. 2.

Figure 9:
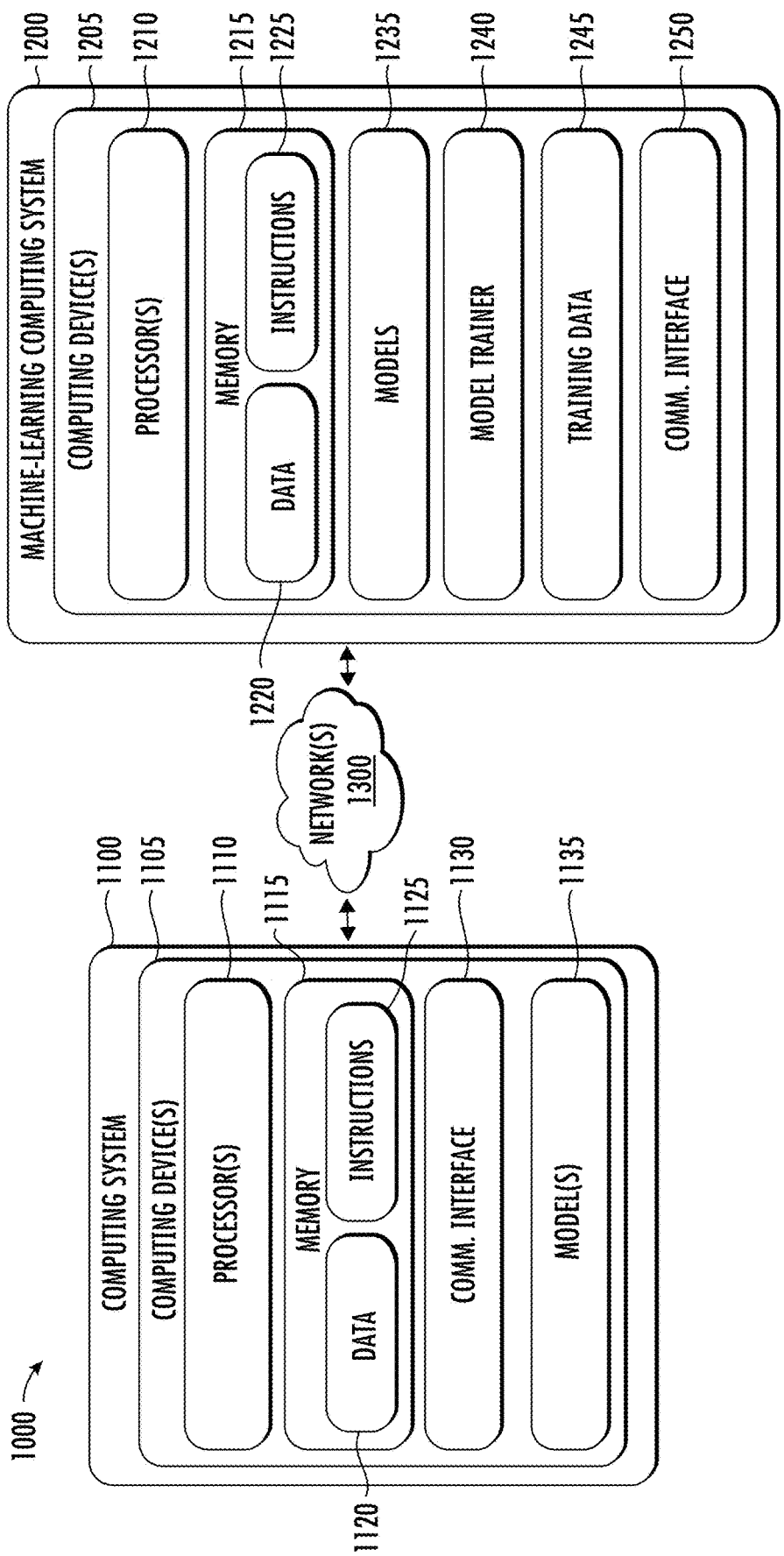
FIG. 9 is a block diagram of an example computing system, according to some implementations of the present disclosure.

FIG. 9 depicts a block diagram of an example system 1000 according to example embodiments of the present disclosure. The example system 1000 includes a computing system 1100 and a machine learning computing system 1200 that are communicatively coupled over one or more networks 1300.

In some implementations, the computing system 1100 can perform one or more observation tasks such as, for example, by obtaining sensor data associated with an environment. In some implementations, the computing system 1100 can be included in an autonomous vehicle. For example, the computing system 1100 can be on-board an autonomous vehicle. In other implementations, the computing system 1100 is not located on-board an autonomous vehicle. The computing system 1100 can include one or more distinct physical computing devices 1105.

The computing system 1100 (or one or more computing device(s) 1105 thereof) can include one or more processors 1110 and a memory 1115. The one or more processors 1110 can be any suitable processing device (e.g., a processor core, a microprocessor, an ASIC, a FPGA, a controller, a microcontroller, etc.) and can be one processor or a plurality of processors that are operatively connected. The memory 1115 can include one or more non-transitory computer-readable storage media, such as RAM, ROM, EEPROM, EPROM, one or more memory devices, flash memory devices, etc., and combinations thereof.

The memory 1115 can store information that can be accessed by the one or more processors 1110. For instance, the memory 1115 (e.g., one or more non-transitory computer-readable storage mediums, memory devices, etc.) can store data 1120 that can be obtained, received, accessed, written, manipulated, created, or stored. The data 1120 can include, for instance, sensor data, sensor data packets, models, feature data, local feature maps, spatial maps, data associated with objects (e.g., classifications, bounding shapes, etc.), map data, simulation data, or any other data or information described herein. In some implementations, the computing system 1100 can obtain data from one or more memory device(s) that are remote from the computing system 1100.

The memory 1115 can also store computer-readable instructions 1125 that can be executed by the one or more processors 1110. The instructions 1125 can be software written in any suitable programming language or can be implemented in hardware. Additionally, or alternatively, the instructions 1125 can be executed in logically or virtually separate threads on processor(s) 1110. The memory 1115 can include a multi-scale memory, as described herein.

For example, the memory 1115 can store instructions 1125 that when executed by the one or more processors 1110 cause the one or more processors 1110 (the computing system 1100) to perform any of the operations, functions, or methods/processes described herein, including, for example, obtain sensor data, generate a local feature map, update a spatial map, determine an object is in the environment, control motion, generate simulation data, etc.

According to an aspect of the present disclosure, the computing system 1100 can store or include one or more machine-learned models 1135. As examples, the machine-learned models 1135 can be or can otherwise include various machine-learned models such as, for example, inpainting networks, generative adversarial networks, neural networks (e.g., deep neural networks, etc.), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks, etc.), convolutional neural networks, or other forms of neural networks.

In some implementations, the computing system 1100 can receive the one or more machine-learned models 1135 from the machine learning computing system 1200 over network(s) 1300 and can store the one or more machine-learned models 1135 in the memory 1115. The computing system 1100 can then use or otherwise implement the one or more machine-learned models 1135 (e.g., by processor(s) 1110, etc.). In particular, the computing system 1100 can implement the machine-learned model(s) 1135 to generate local feature maps, update spatial maps, or determine objects are in the environment.

The machine learning computing system 1200 can include one or more computing devices 1205. The machine learning computing system 1200 can include one or more processors 1210 and a memory 1215. The one or more processors 1210 can be any suitable processing device (e.g., a processor core, a microprocessor, an ASIC, a FPGA, a controller, a microcontroller, etc.) and can be one processor or a plurality of processors that are operatively connected. The memory 1215 can include one or more non-transitory computer-readable storage media, such as RAM, ROM, EEPROM, EPROM, one or more memory devices, flash memory devices, etc., and combinations thereof.

The memory 1215 can store information that can be accessed by the one or more processors 1210. For instance, the memory 1215 (e.g., one or more non-transitory computer-readable storage mediums, memory devices, etc.) can store data 1220 that can be obtained, received, accessed, written, manipulated, created, or stored. The data 1220 can include, for instance, sensor data, sensor data packets, models, feature data, local feature maps, spatial maps, data associated with objects (e.g., classifications, etc.), map data, simulation data, data communicated to/from a vehicle, simulation data, or any other data or information described herein. In some implementations, the machine learning computing system 1200 can obtain data from one or more memory device(s) that are remote from the machine learning computing system 1200.

The memory 1215 can also store computer-readable instructions 1225 that can be executed by the one or more processors 1210. The instructions 1225 can be software written in any suitable programming language or can be implemented in hardware. Additionally, or alternatively, the instructions 1225 can be executed in logically or virtually separate threads on processor(s) 1210.

For example, the memory 1215 can store instructions 1225 that when executed by the one or more processors 1210 cause the one or more processors 1210 (the computing system) to perform any of the operations, functions, methods, or processes described herein, including, for example, training a machine-learned convolutional model, interpolation model, concatenation model, self-attention model, classification model, etc.

In some implementations, the machine learning computing system 1200 includes one or more server computing devices. If the machine learning computing system 1200 includes multiple server computing devices, such server computing devices can operate according to various computing architectures, including, for example, sequential computing architectures, parallel computing architectures, or some combination thereof.

In addition, or alternatively to the model(s) 1235 at the computing system 1100, the machine learning computing system 1200 can include one or more machine-learned models 1235. As examples, the machine-learned models 1235 can be or can otherwise include various machine-learned models such as, for example, inpainting networks, generative adversarial networks, neural networks (e.g., deep neural networks, etc.), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks, etc.), convolutional neural networks, or other forms of neural networks.

In some implementations, the machine learning computing system 1200 or the computing system 1100 can train the machine-learned models 1135 or 1235 through use of a model trainer 1240. The model trainer 1240 can train the machine-learned models 1135 or 1235 using one or more training or learning algorithms. One example training technique is backwards propagation of errors. In some implementations, the model trainer 1240 can perform supervised training techniques using a set of labeled training data. In other implementations, the model trainer 1240 can perform unsupervised training techniques using a set of unlabeled training data. The model trainer 1240 can perform a number of generalization techniques to improve the generalization capability of the models being trained. Generalization techniques include weight decays, dropouts, or other techniques.

In particular, the model trainer 1240 can train a machine-learned model 1135 or 1235 based on a set of training data 1245. The training data 1245 can include, for example, labeled sequential sensor data indicative of portions of one or more environments at different timesteps. In some implementations, the training data can include environment(s) previously recorded by the autonomous vehicle with one or more objects. The model trainer 1240 can be implemented in hardware, firmware, or software controlling one or more processors.

The computing system 1100 and the machine learning computing system 1200 can each include a communication interface 1130 and 1250, respectively. The communication interfaces 1130/1250 can be used to communicate with one or more systems or devices, including systems or devices that are remotely located from the computing system 1100 and the machine learning computing system 1200. A communication interface 1130/1250 can include any circuits, components, software, etc. for communicating with one or more networks 1300. In some implementations, a communication interface 1130/1250 can include, for example, one or more of a communications controller, receiver, transceiver, transmitter, port, conductors, software or hardware for communicating data.

The network(s) 1300 can be any type of network or combination of networks that allows for communication between devices. In some embodiments, the network(s) can include one or more of a local area network, wide area network, the Internet, secure network, cellular network, mesh network, peer-to-peer communication link or some combination thereof and can include any number of wired or wireless links. Communication over the network(s) 1300 can be accomplished, for instance, through a network interface using any type of protocol, protection scheme, encoding, format, packaging, etc.

FIG. 9 illustrates one example computing system 1000 that can be used to implement the present disclosure. Other computing systems can be used as well. For example, in some implementations, the computing system 1100 can include the model trainer 1240 and the set of training data 1245. In such implementations, the machine-learned models 1235 can be both trained and used locally at the computing system 1100. As another example, in some implementations, the computing system 1100 is not connected to other computing systems.

In addition, components illustrated or discussed as being included in one of the computing systems 1100 or 1200 can instead be included in another of the computing systems 1100 or 1200. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks or operations can be performed sequentially or in parallel. Data and instructions can be stored in a single memory device or across multiple memory devices.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

Aspects of the disclosure have been described in terms of illustrative embodiments thereof. Numerous other embodiments, modifications, and/or variations within the scope and spirit of the appended claims can occur to persons of ordinary skill in the art from a review of this disclosure. Any and all features in the following claims can be combined and/or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein. Also, terms such as "based on" should be understood as "based at least in part on".

Those of ordinary skill in the art, using the disclosures provided herein, will understand that the elements of any of the claims discussed herein can be adapted, rearranged, expanded, omitted, combined, or modified in various ways without deviating from the scope of the present disclosure.

Some of the claims are described with a letter reference to a claim element for exemplary illustrated purposes and is not meant to be limiting. The letter references do not imply a particular order of operations. For instance, letter identifiers such as (a), (b), (c), . . . , (i), (ii), (iii), . . . , etc. may be used to illustrate method operations. Such identifiers are provided for the ease of the reader and do not denote a particular order of steps or operations. An operation illustrated by a list identifier of (a), (i), etc. can be performed before, after, and/or in parallel with another operation illustrated by a list identifier of (b), (ii), etc.

What is claimed is:

1. A computer-implemented method for motion forecasting and planning, the method comprising:
   (a) determining a plurality of actors within an environment of an autonomous vehicle from sensor data descriptive of the environment;
   (b) determining a plurality of future motion scenarios based on the sensor data, wherein determining the plurality of future motion scenarios comprises: (i) evaluating a diversity objective that rewards sampling of the plurality of future motion scenarios that require distinct reactions from the autonomous vehicle;
   (c) determining an estimated probability for the plurality of future motion scenarios; and
   (d) generating a contingency plan for motion of the autonomous vehicle, wherein the contingency plan comprises a plurality of trajectories associated with the plurality of future motion scenarios, and wherein the contingency plan is generated based on the plurality of future motion scenarios and the estimated probability for the plurality of future motion scenarios.

2. The computer-implemented method of claim 1, wherein (a) comprises processing features from corresponding map data, the corresponding map data comprising sparse map data indicative of a limited number of environmental features.

3. The computer-implemented method of claim 1, wherein (b) comprises evaluating an energy function, the energy function indicative of a self-distance energy configured to promote diversity in behaviors of all actors associated with the plurality of future motion scenarios equally.

4. The computer-implemented method of claim 3, wherein the energy function is further indicative of a reconstruction energy configured to preserve data reconstruction associated with the plurality of future motion scenarios.

5. The computer-implemented method of claim 1, wherein (c) comprises employing a graph neural network (GNN) to generate a score corresponding to the estimated probability.

6. The computer-implemented method of claim 1, wherein (d) comprises generating a single subsequent action in response to the estimated probability for the plurality of future motion scenarios.

7. The computer-implemented method of claim 1, further comprising (e) controlling motion of the autonomous vehicle based on the contingency plan.

8. The computer-implemented method of claim 1, wherein the contingency plan comprises at least one short-term trajectory and a plurality of subsequent long-term trajectories.

9. An autonomous vehicle (AV) control system comprising:
   one or more processors; and
   one or more non-transitory computer-readable media that store instructions executable by the one or more processors to cause the AV control system to perform operations, the operations comprising:
   (a) determining a plurality of actors within an environment of an autonomous vehicle from sensor data descriptive of the environment;
   (b) determining a plurality of future motion scenarios based on the sensor data, wherein determining the plurality of future motion scenarios comprises: (i) evaluating a diversity objective that rewards sampling of the plurality of future motion scenarios that require distinct reactions from the autonomous vehicle;
   (c) determining an estimated probability for the plurality of future motion scenarios; and
   (d) generating a contingency plan for motion of the autonomous vehicle, wherein the contingency plan comprises a plurality of trajectories associated with the plurality of future motion scenarios, and wherein the contingency plan is generated based on the plurality of future motion scenarios and the estimated probability for the plurality of future motion scenarios.

10. The AV control system of claim 9, wherein (a) comprises processing features from corresponding map data, the corresponding map data comprising sparse map data indicative of a limited number of environmental features.

11. The AV control system of claim 9, wherein (b) comprises evaluating an energy function, the energy function indicative of a self-distance energy configured to promote diversity in behaviors of all actors associated with the plurality of future motion scenarios equally.

12. The AV control system of claim 11, wherein the energy function is further indicative of a planning diversity energy configured to promote diverse samples for subsequent motion planning tasks.

13. The AV control system of claim 9, wherein (c) comprises employing a graph neural network (GNN) to generate a score corresponding to the estimated probability.

14. The AV control system of claim 9, wherein (d) comprises generating a single subsequent action in response to the estimated probability for the plurality of future motion scenarios.

15. The AV control system of claim 9, wherein the sensor data is obtained from a remote computing system.

16. The AV control system of claim 9, wherein the contingency plan comprises at least one short-term trajectory and a plurality of subsequent long-term trajectories.

17. An autonomous vehicle comprising:
   one or more processors; and
   one or more non-transitory computer-readable media that store instructions executable by the one or more processors to cause the autonomous vehicle to perform operations, the operations comprising:
   (a) determining a plurality of actors within an environment of the autonomous vehicle from sensor data descriptive of the environment;
   (b) determining a plurality of future motion scenarios based on the sensor data, wherein determining the plurality of future motion scenarios comprises: (i) evaluating a diversity objective that rewards sampling of the plurality of future motion scenarios that require distinct reactions from the autonomous vehicle;
   (c) determining an estimated probability for the plurality of future motion scenarios; and
   (d) generating a contingency plan for motion of the autonomous vehicle, wherein the contingency plan comprises a plurality of trajectories associated with the plurality of future motion scenarios, and wherein the contingency plan is generated based on the plurality of future motion scenarios and the estimated probability for the plurality of future motion scenarios.

18. The autonomous vehicle of claim 17, wherein (a) comprises processing features from corresponding map data, the corresponding map data comprising sparse map data indicative of a limited number of environmental features.

19. The autonomous vehicle of claim 17, wherein (b) comprises evaluating an energy function, the energy function indicative of a self-distance energy configured to promote diversity in behaviors of all actors associated with the plurality of future motion scenarios equally.

20. The autonomous vehicle of claim 17, wherein (c) comprises employing a graph neural network (GNN) to generate a score corresponding to the estimated probability.

\* \* \* \* \*